United States Patent [19]
McIntyre

[11] Patent Number: 5,307,350
[45] Date of Patent: Apr. 26, 1994

[54] METHOD FOR COLLISON AVOIDANCE ON A CHARACTER SENSE, MULTIPLE ACCESS LOCAL AREA NETWORK

[75] Inventor: Keith E. McIntyre, Roseville, Calif.
[73] Assignee: Veri Fone Inc., Redwood City, Calif.
[21] Appl. No.: 937,514
[22] Filed: Aug. 28, 1992
[51] Int. Cl.$^5$ ............................................. H04L 12/40
[52] U.S. Cl. .................................. 370/85.3; 370/85.6; 370/94.1; 340/825.5
[58] Field of Search ..................... 370/85.2, 85.3, 85.4, 370/85.5, 85.6, 100.1, 92, 94.1, 94.2, 94.3; 340/825.5, 825.51, 825.52

[56] References Cited

U.S. PATENT DOCUMENTS

| | | | |
|---|---|---|---|
| 4,412,326 | 10/1983 | Limb | 370/85.3 |
| 4,623,886 | 11/1986 | Livingston | 370/85.2 |
| 4,628,311 | 12/1986 | Milling | 370/85.2 |
| 4,670,872 | 6/1987 | Cordill | 370/85.2 |

*Primary Examiner*—Douglas W. Olms
*Assistant Examiner*—Hassan Kizou
*Attorney, Agent, or Firm*—Lowell C. Bergstedt

[57] ABSTRACT

A method for data communication between a multiplicity of devices coupled to a LAN Bus without data transmission collisions. Each device is assigned a unique device address and a unique transmit time slot based thereon. The method involves responding to each data character received in each receiving device by loading a LAN.TIMESTAMP parameter with the CUR.SYS.-TIME parameter. Thus the LAN.TIMESTAMP parameter indicates the time of the last data character when an incoming data packet terminates. Packet termination is declared when the LAN Bus is quiescent for a period after the last character equal to the PKT.END-.DELAY value which is preselected. The method also involves determining whether the value of CUR.SYS.-TIME represents a point in the unique transmit time slot for the device and then in response to determining that CUR.SYS.TIME is within the time slot, initiating the transmission of data if available, or otherwise, setting a new LAN.TIMESTAMP value. The method also involves invoking a transmit throttle after a device has finished transmitting a packet on the LAN Bus to provide fairness in LAN Bus access.

13 Claims, 11 Drawing Sheets

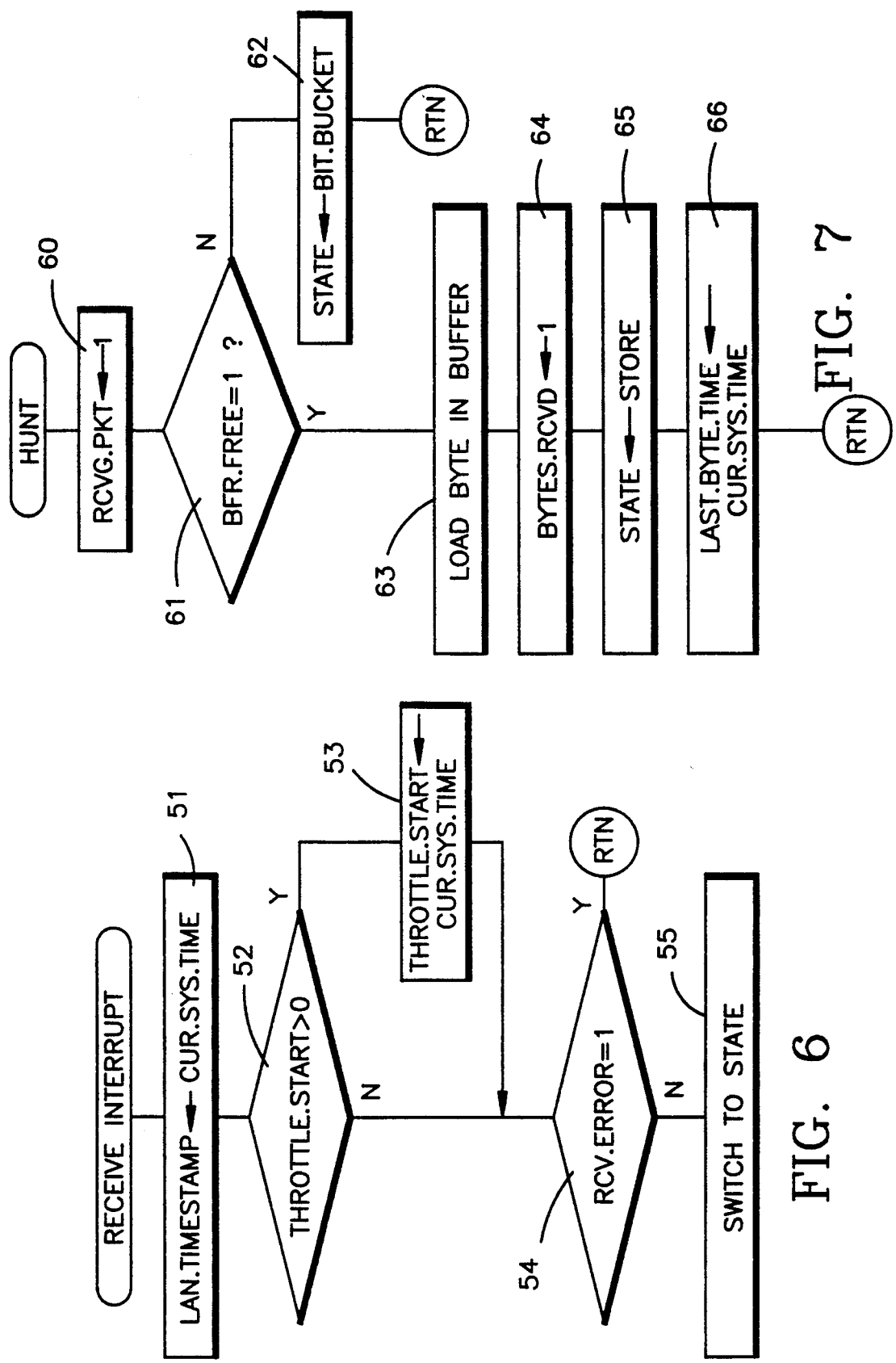

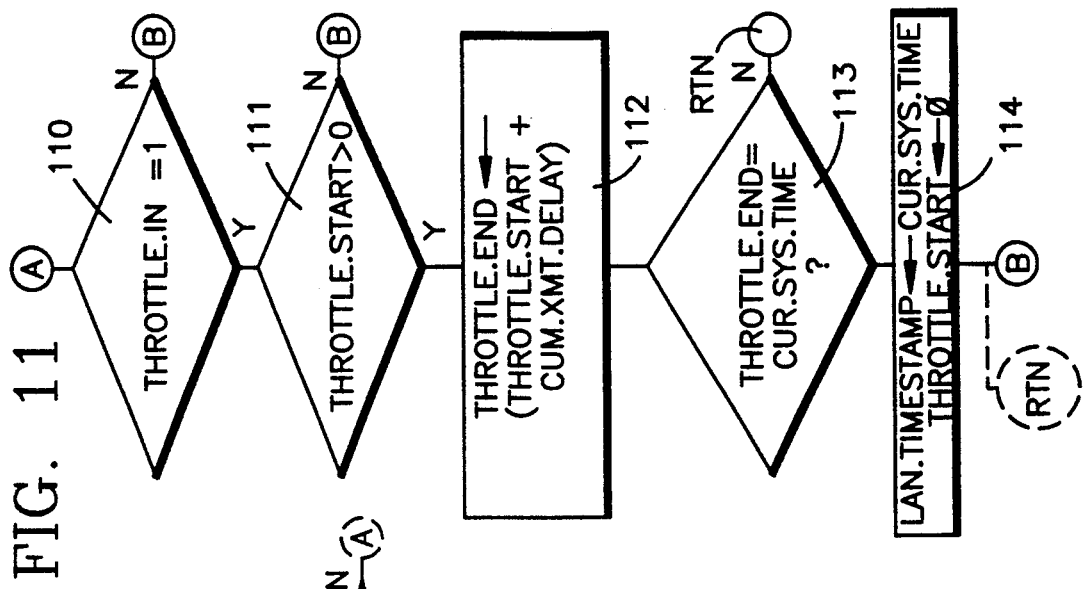
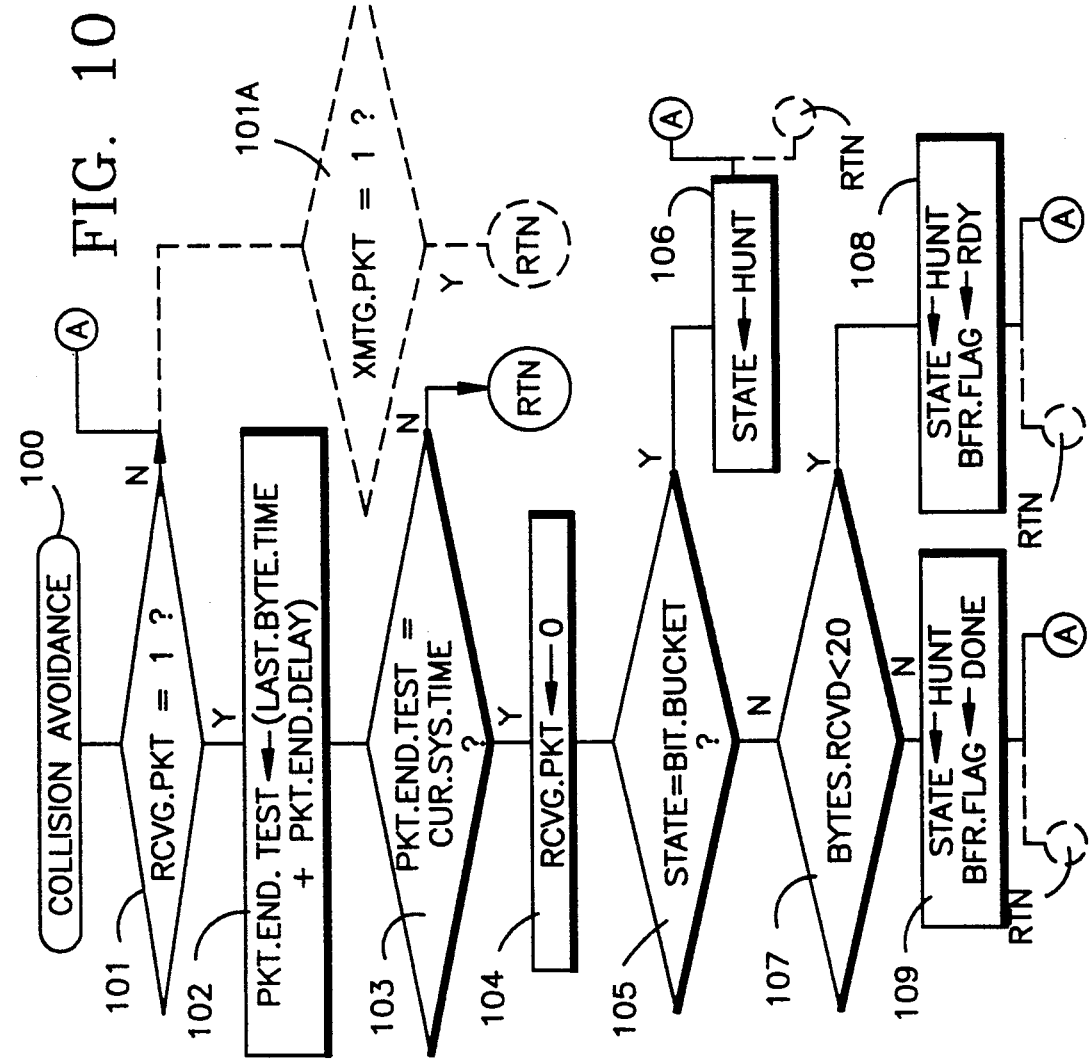

METHOD FOR COLLISON AVOIDANCE ON A CHARACTER SENSE, MULTIPLE ACCESS LOCAL AREA NETWORK

FIELD OF THE INVENTION

This invention relates generally to methods of data communication on local area network systems and more particularly to a method for collision avoidance on a character sense, multiple access LAN Bus system.

BACKGROUND OF THE INVENTION

A number of different types of local area network (LAN) systems have been developed and implemented over the last two decades. The LAN systems have different topologies and protocols and various LAN standards have been set by various groups. An overview of industry standard LAN media and protocols is provide in Chapter Six of a book entitled: COMPUTER NETWORKS by U. Black, published by Prentice Hall, Inc. in 1987. This invention will be described in connection with a particular implementation in a RS-485 LAN Bus topology using a layered protocol in accordance with the OSI architectural standard. The electrical characteristics of an RS-485 interface are set forth in EIA STANDARD EIA 485 published by the Electronic Industries Association in April 1983 and available from the Engineering Department of that Association located in Washington, DC. A discussion of the OSI architecture and layered protocols is found in the above referenced book by U. Black in Chapter Three.

Prior art systems which utilize character sense, multiple access protocols generally use collision detection methods to handle the possibility of data transmission collisions on the LAN Bus. A discussion of various aspects of such collision detection schemes is given in Chapter Six of the above referenced book by U. Black.

OBJECTS OF THIS INVENTION

The principal object of this invention is to provide an effective method for collision avoidance in a character sense, multiple access LAN Bus system.

It is another object of this invention to provide a method for collision avoidance which provides for peer to peer data exchange.

It is another object of this invention to provide a method for collision avoidance which provides for inherent data transparency.

It is another object of this invention to provide a method for collision avoidance which is easily implemented on a variety of computers.

It is another object of this invention to provide a method for collision avoidance which is adaptable to a wide variety of applications.

It is another object of this invention to provide a method for collision avoidance which is useful on a variety of LAN media such as RS-485 and various radio LANs, for example.

FEATURES OF THIS INVENTION

This invention features a method for data communication between a multiplicity of devices coupled to a LAN Bus without collisions between data transmissions from plural devices and without supervision by one master device. The data communications take place at a preselected baud rate common to each device. Each device is assigned a unique device address and a unique transmit time slot based on the unique device address and has a system time clock incrementing a CUR.SYS.TIME parameter at a prearranged common frequency. The method comprises a. responding to each data character received in each receiving device by loading a LAN.TIMESTAMP parameter with the value of the CUR.SYS.TIME parameter in such device so that the LAN.TIMESTAMP parameter indicates the time of the last data character when an incoming data packet terminates, b. responding to each tick of the system time clock in each receiving device after termination of an incoming data packet by b.1. determining whether the value of CUR.SYS.TIME at the clock tick represents a point in the unique transmit time slot for the device measured from the LAN.TIMESTAMP value, and b.2. in response to determining that CUR.SYS.TIME is within the time slot, initiating the transmission of data by the device if a data packet is available, or otherwise, b.3 setting a new LAN.TIMESTAMP value based on the time difference between the start of the unique transmit time slot and the cumulative length of the transmit time slots for all of the devices.

This invention has the advantage of restricting each device to transmit only within its own time slot but keeping devices in synchronism by use of the LAN.TIMESTAMP parameter associated with received data characters. This ensures that all devices on the LAN Bus will calculate their own slot time accurately.

Preferably the method is performed such that step a. is carried out during a Receiving Data Time Period starting with receipt of the first character and further comprises the steps of:

a.1. responding to each data character received during said Receiving Data Time Period by loading a LAST.BYTE.TIME parameter with the value of said CUR.SYS.TIME parameter so that said LAST.BYTE.TIME parameter contains the CUR.SYS.TIME value of the last character received; and a.2. responding to each clock tick during said Receiving Data Time Period by determining if the value of CUR.SYS.TIME is equal to said value of LAST.BYTE.TIME plus a prearranged PKT.END.DELAY parameter value and, if so, declaring an end to said Receiving Data Time Period.

With each device determining the end of a data packet by the passage of a silent interval after the last character received, the operation of the system is independent of the data and no STX/ETX protocol or use of framing bits to indicate start and end of data is required.

The method of this invention also preferably includes the further steps of c. responding to the transmission of each data character of a data packet by a transmitting device by loading the LAN.TIMESTAMP parameter in the device with the value of CUR.SYS.TIME so that the LAN.TIMESTAMP parameter will contain the time of transmission of the last data character by the device;

d. responding to transmission of a data packet by a transmitting device by setting a throttle start parameter to a value indicating that the device has transmitted a packet of data;

e. responding to each tick of the system time clock in the transmitting device after termination of a data transmission period by e.1. determining whether a throttle period is ended based on a predetermined throttle algorithm, and e.2. inhibiting transmission of another packet of data by the device during the throttle period, and e.3. resetting the throttle start parameter when the throttle period has terminated.

The throttle feature of this invention provides a fairness element to access to the LAN Bus by devices regardless of their address by preventing priority access by the lower address devices. Various throttle algorithms may be implemented to provide varying degrees of fairness in LAN Bus access.

Other object, features and advantages of this invention will be apparent from the detailed description set forth below in conjunction with the associated drawing FIGURES.

BRIEF DESCRIPTION OF THE DRAWINGS

FIGS. 6-8 illustrate the steps of a Receive Interrupt Service Routine useful in the method of this invention.

FIGS. 10-12 illustrate the steps of one embodiment of a Collision Avoidance Routine utilizing the method of this invention.

DESCRIPTION OF PREFERRED EMBODIMENTS

A. Example of One Hardware Environment

Figure 1:
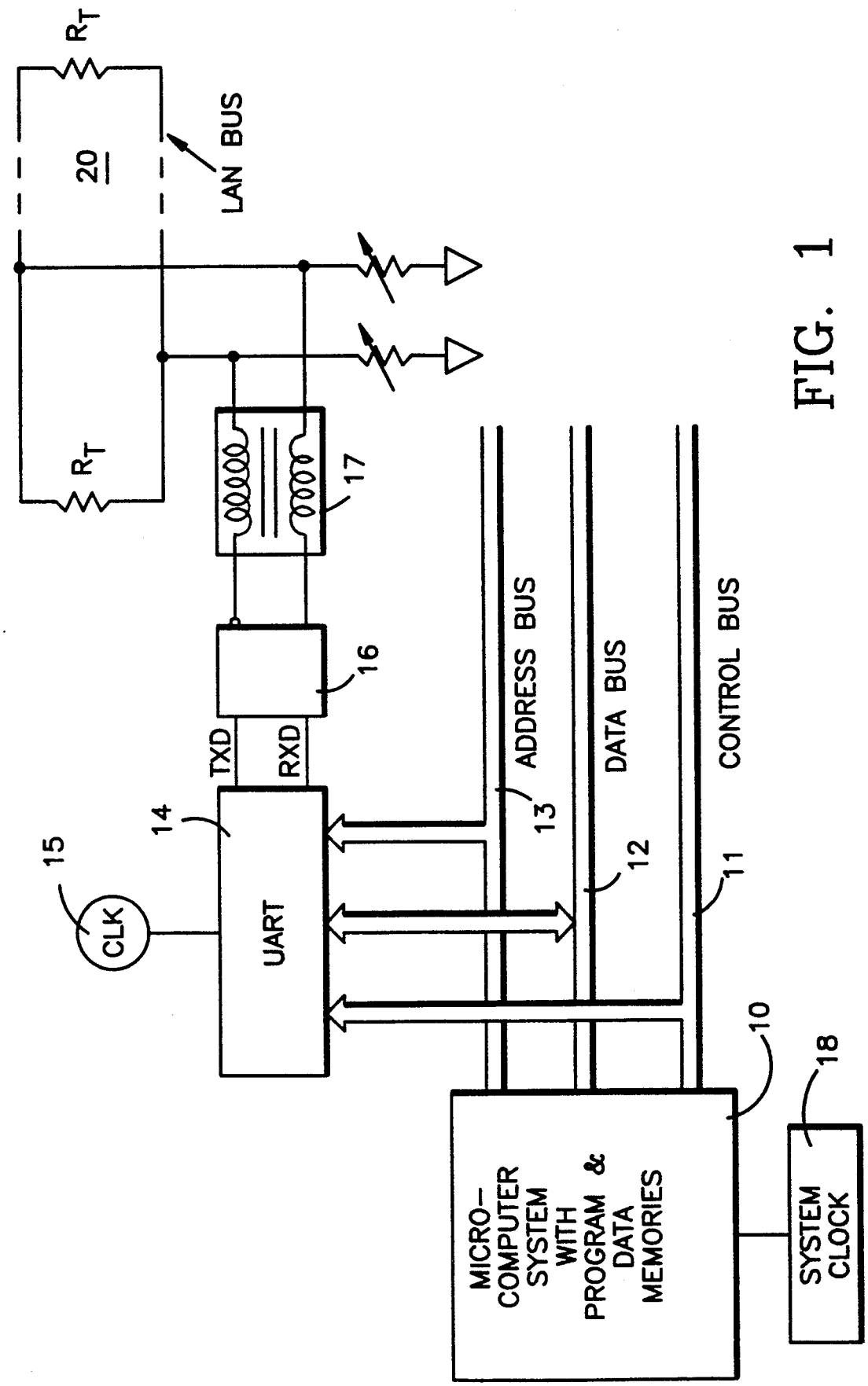
FIG. 1 is a mostly block schematic diagram of a hardware environment in which the method of this invention has been implemented.
Figure 2:
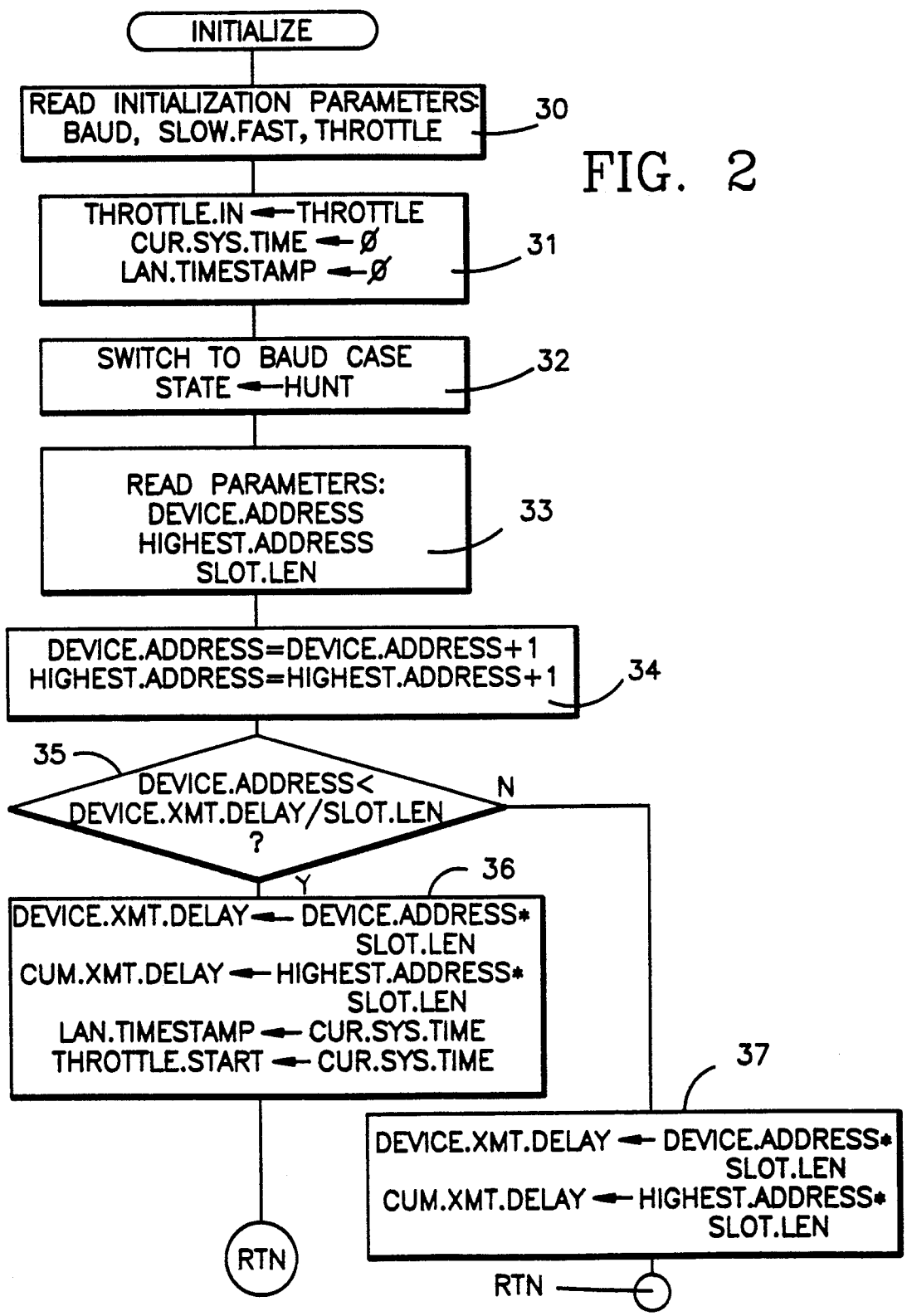
FIGS. 2-5 illustrate the steps of an Initialization Routine useful in connection with the method of this invention.

FIG. 1 is a simplified schematic diagram of one device hardware environment implementing the RS-485 interface. Since the method of this invention is independent of the hardware environment, this specific environment is shown by way of example only and persons of skill in LAN system architectures will readily appreciate other hardware environments in which the invention can be employed.

Microcomputer system 10 comprises a microprocessor or microcontroller unit such as, for example, Toshiba Microprocessor TMP-68301, along with program and data memories and other components and subsystems required for handling the operating features required for the application of the device. For example, this invention has been implemented in Point of Sale terminal device, on OMNI 480 Transaction Terminal manufactured and sold by Verifone Inc. of Redwood City, California. The hardware implementation follows the 485 LAN standard and details on the hardware implementation in the OMNI 480 are available on request from VeriFone.

Microcomputer system 10 has a system clock 18 and, as is well known, may have a number of clock driven interrupt timers for calling various interrupt driven software routines. Control bus 11, data bus 12, and address bus 13 are coupled to a standard UART 14 (e.g. the Model SCC2691 available from Signetics Corporation) which is driven by a separate clock 15. A bus interface device 16 (e.g. the Model DS3695 available from National Semiconductor) couples the transmit (TXD) and receive (RXD) lines from UART 14 through choke 17 to LAN Bus 20.

B. General Working Principles of the Invention.

1. Background constraints

As noted, the OMNI 480 terminal which is one hardware environment employs the RS-485 interface for its LAN. The RS-485 interface itself imposes well-known constraints, some of which are discussed below.

1.2 Collision Detection not Reliable

The second contraint is the inability to detect multiple transmitters being active in transmitting data on the LAN Bus simultaneously. Due to the electrical characteristics of RS-485 LANs, different receivers will hear different transmitters when this happens. Receivers will usually accurately receive the data bytes from the closest transmitter that is currently transmitting, but other receivers are likely to receive a garbled combination of the two sets of data.

As a result, a major problem on an RS-485 LAN is that Collision Detection can not be done reliably. This eliminates the use of prior art protocol concepts that depend on collision detection. As a result this invention uses a collision avoidance protocol that depends on "collision windows" and "slot times" the meanings of which in the context of a collision avoidance method in a character sense, multiple access system will be discussed below.

1.3 Constraint 3-Devices Hear All Data Traffic

All receivers always hear all the traffic on an RS-485 LAN. In some prior art implementations of LANs this has been a serious consideration. In implementing the method of this invention, one goal is to reduce the amount of traffic on the LAN under the vast majority of conditions. This in turn reduces CPU loading on all the terminals on the LAN.

In some prior art LAN protocols one terminal (a form of device) is the controller (or master) terminal and the other 11 terminals are slaves. The controller terminal polls the slave terminals continually to see if they have any data to transmit. This polling puts a continuous data load on the LAN even when none of the terminals have any data to transmit. The controller device in a POS environment may also double as a link to a transaction authorization line and thus have to support two high speed links simultaneously. Under the protocol of this invention, there is no master/slave terminal relationship, only peer terminals, and thus the LAN Bus may see a packet of data transmitted only once every few minutes—even for an POS Terminal installation that is fairly busy.

1.4 Constraint 4—Low Speed, Single Character XMT

When this invention is employed in a hardware environment using with low speed links (e.g. 19,200 bps or less) limiting the amount of traffic on the LAN Bus is obviously an advantage. The less traffic on the LAN, the more potential bandwidth available for all the terminals to use. If the devices coupled to the LAN Bus utilize interrupt driven UARTs as in the hardware shown in FIG. 1, instead of DMA devices, there are limits on how much data can be processed at any given baud rate on the LAN.

1.5 Constraint 5—Noisy Environment

The RS-485 LAN is a low cost LAN solution and is often used in noisy environments. Since the LAN Bus in this case is not well isolated from noise, the method of this invention must be able to handle noise on the LAN Bus.

2. Collision Avoidance Method of this Invention.

A Collision Avoidance Routine in accordance with this invention utilizes the concept of collision windows or slot times. Collision window is a term normally used to describe the amount of time an electrical signal takes to propagate through a cable and to be detected by every terminal on the network. This is a real concern on a high speed network such as Ethernet running at 10 megahertz. This invention is for networks running at lower speeds, e.g. 19.2 kilohertz or less, so electrical propagation delay is negligible compared to the speed of the transmitted data. Slot time normally describes how long it takes a signal to propagate through a cable plus the acquisition time for the channel. In other words, the length of time after transmission of data starts plus the length of time it takes for all other transceivers to recognize acquisition of the media. In the hardware environment serving as our example, this translates into the following: slot time = electrical propagation of 28 microseconds + character receipt time by serial port of 521 microseconds + interrupt processing by CPU of 120 microseconds, for a slot time of 669 microseconds.

This means that if a device starts transmitting it will be 669 microseconds before every other device on the LAN realizes this fact. This is a substantial amount of time since, for example, the VeriFone OMNI 480 terminal can execute about 1000 instructions during this amount of slot time.

3. Principles of this Invention

The software protocol or method executing in all of the devices on the LAN follow strict, but simple rules on when they can transmit, and equally strict, but simple rules about how long to listen. The timing discussed herein is based on an example of a 19,200 bps transmission rates but the same principles apply in an obvious way at other rates. The method of this invention utilizes a device address parameter and a highest address parameter. There can not be duplicate device addresses and it is preferable to avoid vacant addresses.

3.1 Rule 1—Collision Avoidance On the LAN

A terminal must monitor the LAN for a time period before it can transmit. This time period is in milliseconds and is equal to 3 times the terminal's address. A terminal with an address of 1 must wait 3 milliseconds, a terminal with an address of 2 must wait 6 milliseconds, a terminal with an address of 10 must wait 30 milliseconds. Thus, as will be seen in the example shown in FIG. 13, a terminal with a device address of 1 is associated with device slot DS1, and thus device 1 has a transmit time slot beginning 3 milliseconds after the start of the LAN transmit window. The terms "time slot" and "device slot" are used interchangeably herein.

When terminal 1 starts transmitting, terminals 2 and 3 start receiving data. This causes them to reset their collision avoidance wait timer to the current time when the character is received. In the device serving as an example of a hardware environment, a CUR.SYS.TIME counter incremented on a one millisecond interval keeps counting up from the time the terminal is powered up. Every time tick that a character is received the current value of CUR.SYS.TIME is saved as a timestamp parameter called LAN.TIMESTAMP indicating when the character was received. After a received packet is terminated, this LAN.TIMESTAMP parameter contains the time of the last character received and is used to start the DEVICE.XMT.DELAY period for that device.

If device 2 has a transmit request pending, it compares the value of CUR.SYS.TIME with the LAN.TIMESTAMP value and if the difference is not 6, then terminal 2 waits for more quiescent time on the LAN until this DEVICE.XMT.DELAY difference value is satisfied.

As can be seen from the previous calculations for collision windows and slot times, 3 milliseconds is far more than the 669 microseconds required for a character to be transmitted and received. In fact, at 19,200 bps, 3 milliseconds is enough time for 4.5 characters with 8 data bits and 1 start and 1 stop bit to be transmitted. Using a SLOT.LEN of 3 milliseconds gives a good safety margin for reasons which will be discussed below.

3.2 Rule 2—Time Slot Expiration/Resetting

Rule number 1 works fine for collision avoidance as long as terminals are constantly transmitting data on the LAN. That rule falls apart when the more normal situation of intermittent data transmission happens. When the LAN is quiescent for a long enough time to satisfy the DEVICE.XMT.DELAY for every device under rule 1, then it is possible for all terminals to start transmitting simultaneously. In reality, only a few terminals might try to transmit at the same time, but the possibility for collisions is obvious. The second rule insures this will not happen by allowing a terminal to transmit only at the start of its time slot. If the start of the time slot for the terminal has been reached without that device having a transmit request pending, then the terminal cannot begin to transmit until the start of its next time slot which is recalculated as part of the method of this invention. This will be more clear from the description of the software routines and examples given below.

It should be understood, however, that the principles of this invention also cover a method in which SLOT.LEN is selected to have a larger value and a device is permitted to begin to transmit on any one of a plurality of system clock ticks at the beginning of its time slot in the LAN transmit window. For example, using the baud rate and other parameters discussed above, it should be apparent that a SLOT.LEN value of 4 milliseconds could be selected and each device could be permitted to transmit on either the first or second clock tick at the beginning of the time slot for that device.

3.3. Rule 3—Timestamping LAN Activity

If any kind of data activity on the LAN is detected, it is timestamped as a received character. A terminal must also timestamp framing errors. This allows electrical noise to generate timestamps in devices on the LAN, but this just slows data throughput for the duration of the noise burst.

3.4 Rule 4—Transmit Throttle

Without a post-tranmit throttle rule, devices with lower addresses on the LAN Bus have an access advantage for transmitting and could during periods of high activity, completely block access by higher address devices.

Rule 4 is therefore a transmit throttling rule that takes into account all the other collision avoidance rules. Once a terminal has transmitted, it must wait to satisfy the following equation before it can transmit again. To give essentially equal access, it is preferable that each device be throttled for a period equal to a CUM.XMT.DELAY which is equal to the highest device address multiplied by the SLOT.LEN value.

This rule can be treated as optional and selected or deselected on a device by device basis without provoking any collisions, since it is independent of collision avoidance and is a fairness rule. For example, a device acting as a host gateway may be assigned a low address value with transmit throttle deselected. This gateway device can then transmit whenever a transaction is ready thereby relieving transmit queue congestion and potentially increasing overall LAN throughput.

3.5 Rule 5—Transmit Throttle Quiescent Time

This is another simple rule—optional but preferred in many applications. While a transmit throttle timeout is still active and not expired, only quiescent time on the LAN is used to satisfy the transmit throttle period. The THROTTLE.START parameter is rest to the CUR.SYS.TIME of each received character while the throttle is active. This forces a throttled device to wait until the LAN is continuously quiescent for a period equal to the CUM.XMT.DELAY value. As long as almost all of the devices on the LAN Bus have the throttle feature selected, this throttle features should allow orderly access to the LAN Bus. Other throttle algorithms will be discussed below.

3.6 Rule 6—Packet Reception—Start Of A Packet

Rule 6 simply requires that if a data byte comes in following a quiescent interval it is treated as the first byte of a data packet. The Collision Avoidance Routine puts the character in a receive buffer for the layer 2 protocol to look at later, subject to a runt packet exception or buffer overflow condition. Rule 6 forces the device to only consider one factor: is there a buffer available. If there is not, then the data is dumped in the bit bucket (thrown away).

3.7 Rule 7—Packet Reception—End Of A Packet

Rule 7 provides that, when a device is in a receiving packet state, a packet is terminated by 2 milliseconds of quiescent time on the LAN. The receive buffer is marked as containing data and then passed on to the layer 2 protocol for analysis.

Earlier it was mentioned that the 3 millisecond minimum interval between transmissions on the LAN was actually bigger than really required. Rule 7 is the reason. This allows for clock "jitter" on all of the devices on the LAN Bus as well as interrupt processing latency on transmit interrupts. It still leaves a substantial margin for error. Clock jitter means that each of the system clocks may be incrementing the CUR.SYS.TIME value at times that are skewed relative to each other. Allowing 2 milliseconds for packet termination and 3 milliseconds for SLOT.LEN ensures that there is a safety margin on each device recognizing the start of its time slot and sending a character that will be received and time stamped before a higher address device will determine that its slot has arrived. While perfect synchronism of relative LAN.TIMESTAMP values is not achieved between devices, the safety margin is adequate to avoid collisions under conditions of maximum clock jitter.

3.8 Rule 8—Runt Packet Rejection (Optional)

Rule 8 states that if a packet is less than 20 bytes in size, it is considered a "runt" packet and discarded immediately. The runt packet is never passed up to the layer 2 protocol. This has two beneficial effects. Line noise on the LAN of short to medium duration is automatically rejected as spurious by the Collision Avoidance Routine. There is a significantly reduced chance of the upper layer protocols being confused by line noise. Diagnostics routines monitoring LAN performance can be enhanced by treating runt packets as probable electrical noise on the LAN and counting the frequency of occurrence.

4. Advantages of this Invention

The use of the method of this invention provides a number of important advantages.

4.1. True Data Transparency

The data transparency feature of the method of this invention provides important advantages. This feature enables the invention to support multiple LAN protocols, to utilize data compression and data encryption methods, to permit use of diagnostic bit patterns, and to transmit multiple concatenated data packets of various types for improved data transmission efficiency.

4.2 Greater Immunity to Noise

Noise is a persistent problem in all real life LAN Bus situations. The method of this invention improves noise rejection since short to medium length bursts of electrical noise will be automatically rejected as a runt packet.

This invention does not, like other LAN protocols, rely on on STX/ETX framing characters. If an ETX is corrupted by noise on the LAN, devices may hang up in weird states for long periods of time. Just as bad is the corruption of data into STX/ETX framing characters. Loss of data at the beginning or end of data packets can also be catastrophic in many other protocol situations. State machines may hang indefinitely until watch dog timers pull them out. Software may be put into incorrect states that cause unforeseen problems that aren't debugged until the product has been installed at the customer's site.

4.3 Ease of Portability

The simplicity of the rules and principles of this invention makes it easy to port the Collision Avoidance Routine to other hardware platforms.

C. One Example of a Software System Using the Invention.

Having discussed the general principles of this invention, a specific software system which employs the invention (and some alternative implementations) will now be discussed in connection with the flow charts and timing diagram examples in FIGS. 2-17.

1. LAN Port Initialization Routine (FIGS. 2-5)

This routine is executed when the device is powered up. In step 30 the initialization parameters BAUD, SLOW.FAST and THROTTLE are read from their storage location. These initialization parameters are set into the device during initial set up. BAUD is the transmission rate of the LAN Bus in bits per second, The SLOW.FAST parameter determines the safety margin on the device time slots. The THROTTLE parameter has a value of either 1 or 0 and determines if the transmit throttle features is selected (1 value) or deselected (0 value).

In step 31, the value of the THROTTLE parameter is loaded into THROTTLE.IN to be available for use in the Collision Avoidance Routine. In addition, the values of LAN.TIMESTAMP and CUR.SYS.TIME are initialized to 0. Step 32 switches execution to the Baud Case determined by the BAUD parameter value and then sets the STATE to HUNT.

The steps following 32 may be called by upper level protocols while the device is operating, if a new device address or highest device address is being assigned on the LAN Bus. Step 33 involves reading the parameters DEVICE.ADDRESS and HIGHEST.ADDRESS which have been loaded during set up or communicated to the device from some other one of the devices. To adjust for use of a DEVICE.ADDRESS of 0 as the first device, step 34 is executed to increment these values by 1 to accommodate the algorithms used in the Collision Avoidance Routine. Step 35 is needed when this routine is called by an upper layer software routine during actual operation of the device when data may be in process of being received from other devices during reassignment of values for this device. This prevents the device from transmitting in the wrong time slot if the DEVICE.SLOT for current values has not arrived but DEVICE.SLOT for the new assignment may have passed.

Step 35 basically check to see if the new value of DEVICE.ADDRESS is less than the old value with the old value calculated by dividing DEVICE.XMT.DELAY by SLOT.LEN. If step 35 returns NO, then step 37 is executed to calculate new values for DEVICE.XMT.DELAY and CUM.XMT.DELAY. If step 36 returns YES, then step 36 is executed to calculate the new values of DEVICE.XMT.DELAY and CUM.XMT.DELAY followed by setting LAN.TIMESTAMP and THROTTLE.START to the value of CUR.SYS.TIME. This puts this terminal in throttle to avoid transmission in the wrong time slot. This completes the initialization routine.

The calculation of DEVICE.XMT.DELAY for this device is the product of the device address on the LAN Bus and the time length SLOT.LEN of the DEVICE.SLOT for each device, e.g. 3 milliseconds in the case that we will use as an example. SLOT.LEN is calculated in the CASE routines based on the BAUD and SLOW.FAST parameter values as will be seen. CUM.XMT.DELAY is the product of the highest device address on the LAN Bus and the value of SLOT.LEN, the length of each time slot.

Figure 3:
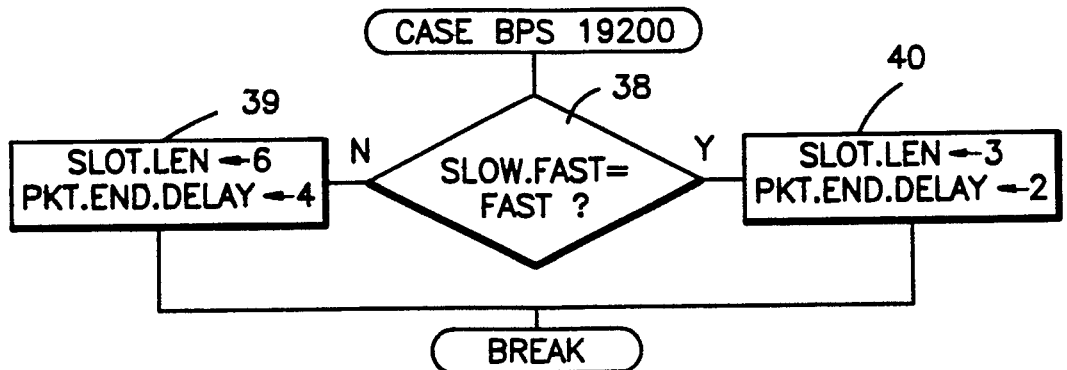
Figure 4:
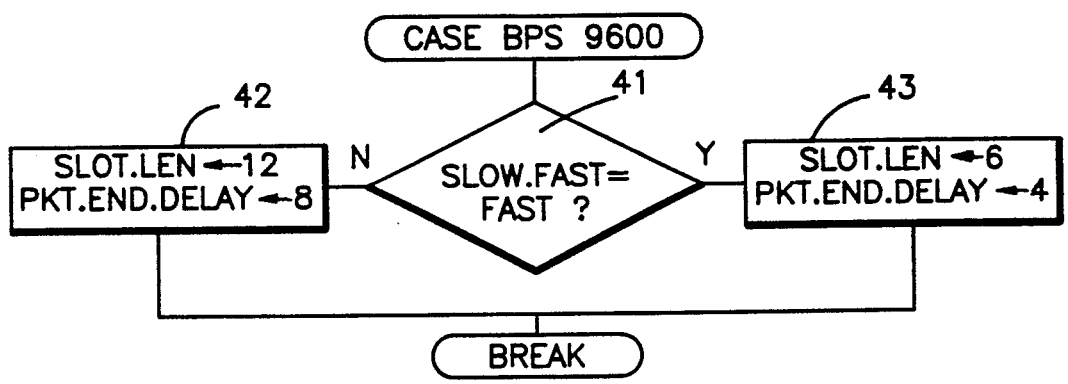
Figure 5:
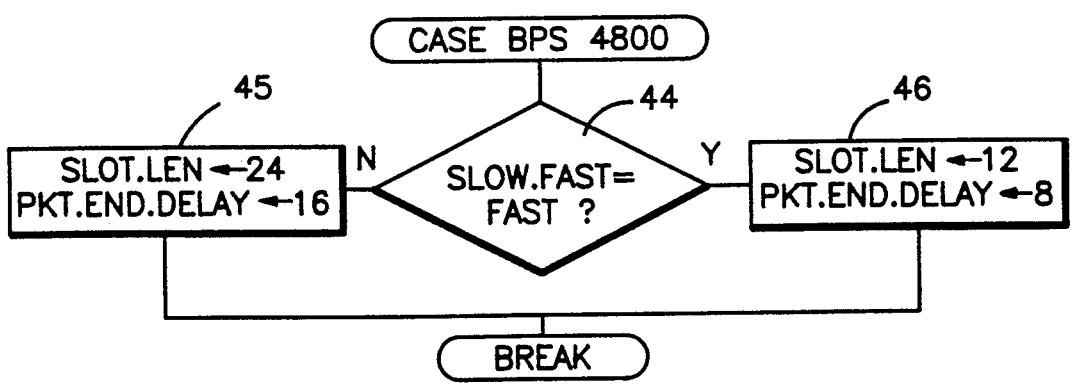

FIGS. 3-5 illustrate the BAUD case routines. Each of steps 38, 41, and 44 test whether the value of the SLOW.FAST parameter is FAST. If this testing step returns YES, then SLOT.LEN and PKT.END.DELAY are set appropriately for shorter lengths of time pertinent to the associate baud rate in one of steps 40, 43, and 46, depending on which CASE is being executed. If the testing step returns NO, then SLOT.LEN and PKT.END.DELAY are set appropriately for the longer lengths of time pertinent to associated baud rates in one of steps 39, 42 and 45. It can thus be seen that this invention can be used at any baud rate provided the valued of SLOT.LEN and PKT.END.DELAY are adjusted appropriately.

Figure 8:
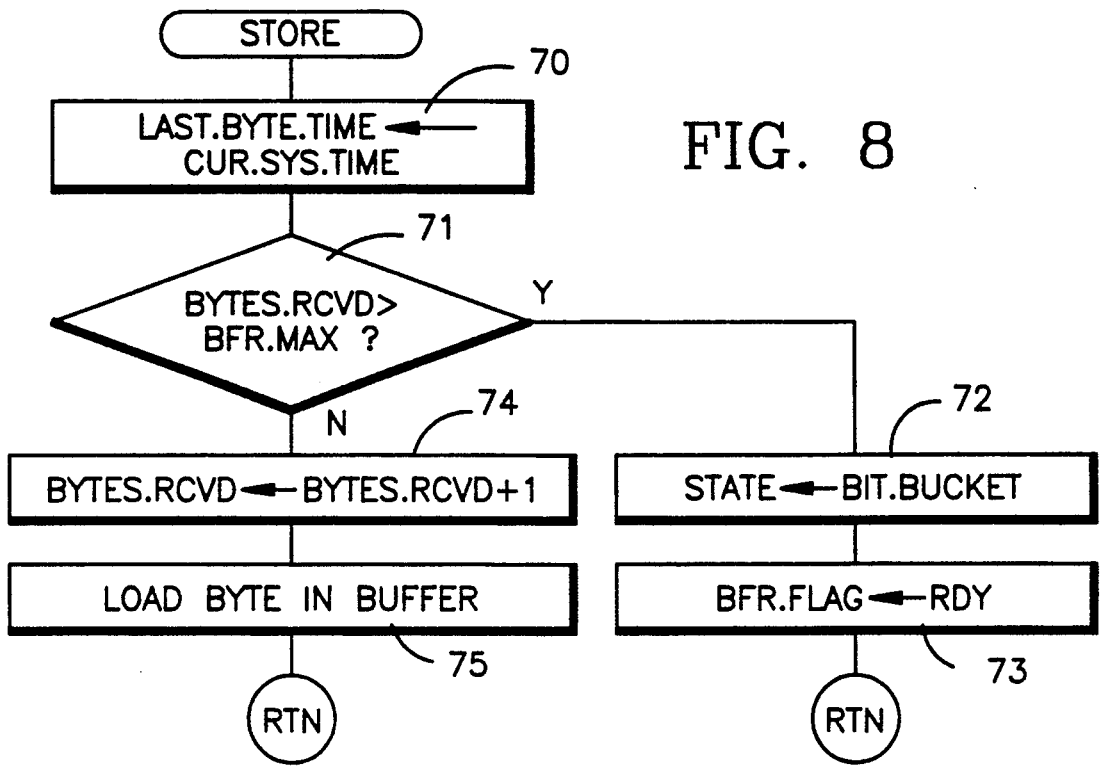

2. The Receive Interrupt Service Routine (FIGS. 6-8)

This routine is executed each time the LAN port receives a input character (byte). Referring to FIG. 6, step 51 sets the LAN.TIMESTAMP parameter to the value of CUR.SYS.TIME. This time stamping of each character received is part of the overall method to synchronize the operation of the Collision Avoidance Routine in each device. The start of the window of LAN availability in each device is determined from the value of LAN.TIMESTAMP associated with the last character received when a packet end has been declared in accordance with the associated algorithm, as will be seen in the discussion of the Collision Avoidance Routine to follow.

Step 52 checks to see if the device is already in a Throttle condition by checking if the value of THROTTLE.START is greater than 0. THROTTLE.START is a parameter which is loaded with the CUR.SYS.TIME each time the Transmit Interrupt Service Routine is executed. This is discussed below. If step 52 returns YES, THROTTLE.START is set to CUR.SYS.TIME in this routine. This is done to reset the start time of the throttle period in accordance with one version of this throttle feature. In this version, as will be seen from the discussion below, the device is kept in a throttle condition until the LAN Bus has been continuously quiescent for a period of time equal to CUM.XMT.DELAY.

If step 52 returns NO, step 54 checks to see if the character received is an error due to noise or other condition. If step 52 returns YES, a RTN is executed. If NO is returned, the Receive Interrupt Service Routine switches to the current receiver state which has been declared, i.e. either HUNT, STORE, or BIT.BUCKET.

2.1. The HUNT routine (FIG. 7)

The first step in the HUNT routine, step 60 is to set the RCVG.DATA flag to a value of 1. Step 61 then checks if a buffer is available to store the data packet coming in. If this step returns NO, then STATE is set to BIT.BUCKET and a RTN is executed. If this step returns YES, then the current byte is loaded into the buffer in step 63 and the BYTES.RCVD counter is set to 1 in step 64. Step 65 sets STATE to STORE and then step 65 sets the LAST.BYTE.TIME parameter to CUR.SYS.TIME and then a RTN is executed. The separate timestamping of each character as the last byte is done separately from the LAN.TIMESTAMP and is used to determine when to declare the end of a data packet.

2.2. The STORE Routine (FIG. 8)

The Store Routine begins with step 70 in which LAST.BYTE.TIME is set to CUR.SYS.TIME. Then a checking step 71 is executed to determine if the buffer is already full. If BYTES.RCVD is greater than the value of BFR.MAX, then we have a data overflow and the data must be thrown away. If this step 71 returns YES, then STATE is set to BIT.BUCKET in step 72, the BFR.FLG is set to RDY and a RTN is executed. If step 71 returns NO, the value of the BYTES.RCVD flag is incremented by 1 in step 74, and the received byte is loaded into the buffer in step 75. Then a RTN is executed.

2.3 The BIT.BUCKET Routine

This routine is not charted since it simply executes a RTN when this state is set into the Receive Interrupt Service Routine state machine. The received data byte is thrown away since it doesn't get saved into a buffer.

Figure 9:
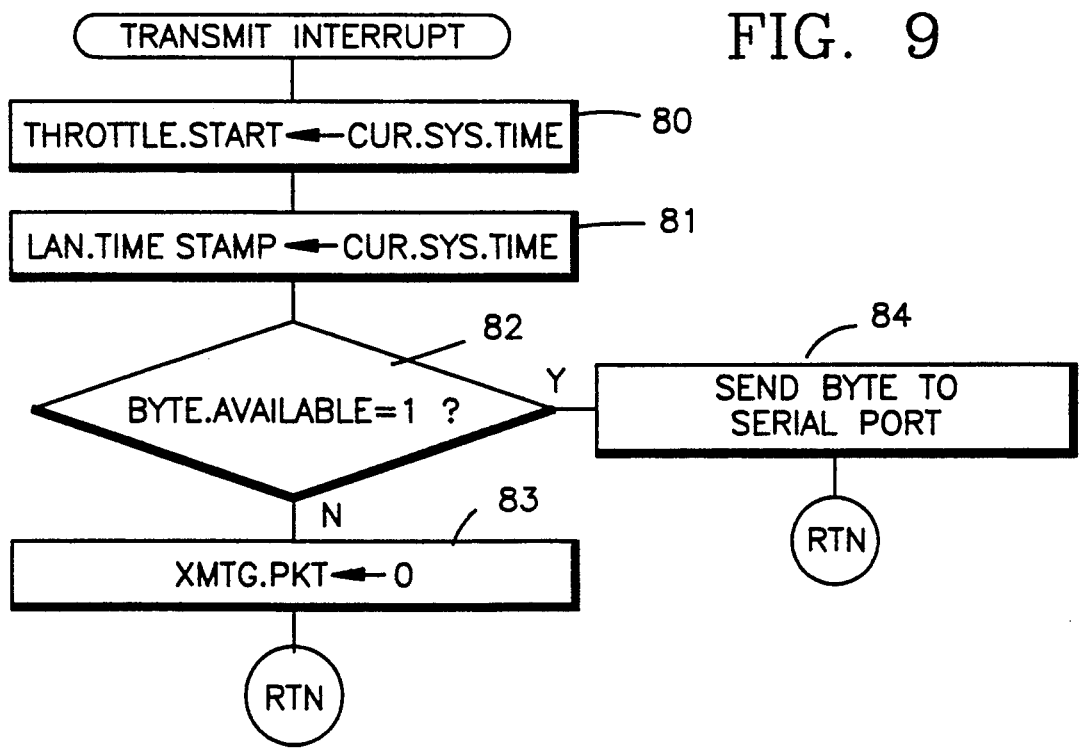
FIG. 9 illustrates the steps of a Transmit Interrupt Service Routine useful in the method of this invention.

3. The Transmit Interrupt Service Routine (FIG. 9)

Steps 80 and 81 of this routine involve setting each of THROTTLE.START and LAN.TIMESTAMP parameters to the value of CUR.SYS.TIME. THROTTLE.START is set each time a character is transmitted so that after transmission of the last character it will have a value corresponding to that system clock at that time. LAN.TIMESTAMP is set each time a character is received so that this device will be kept in sync with other devices which will treat the time of the receipt of the last character as the LAN.TIMESTAMP value that starts the next window for DEVICE.SLOT values relating to initiating transmission of data on the LAN Bus. Step 82 checks if there is a byte available for transmitting. If step 83 returns YES, step 84 is executed to send the next byte to the serial port and so it will be transmitted on this clock tick, followed by a RTN. If step 83 returns NO, then the transmission of a data packet is completed and the parameter XMTG.PKT is reset to zero in step 83 before a RTN is executed.

The Transmit Interrupt Service Routine may also include steps to allow concatenation of data packets if an additional packet is ready for transmitting before the first is completed. This feature is enabled by the use of this invention, but is not actually a part of this invention and will not be discussed here. Its implementation would be apparent to persons skilled in this art.

The Transmit Interrupt Service Routine is called when the hardware environment senses that an initial data byte is being transmitted due to the action of the Collision Avoidance Routine. It will continue to execute as long as there are data bytes being sent. The operation of the Collision Avoidance Routine to send the first data byte in the appropriate time slot is discussed below.

4. Collision Avoidance Routine (FIGS. 10-12)

Figure 12:
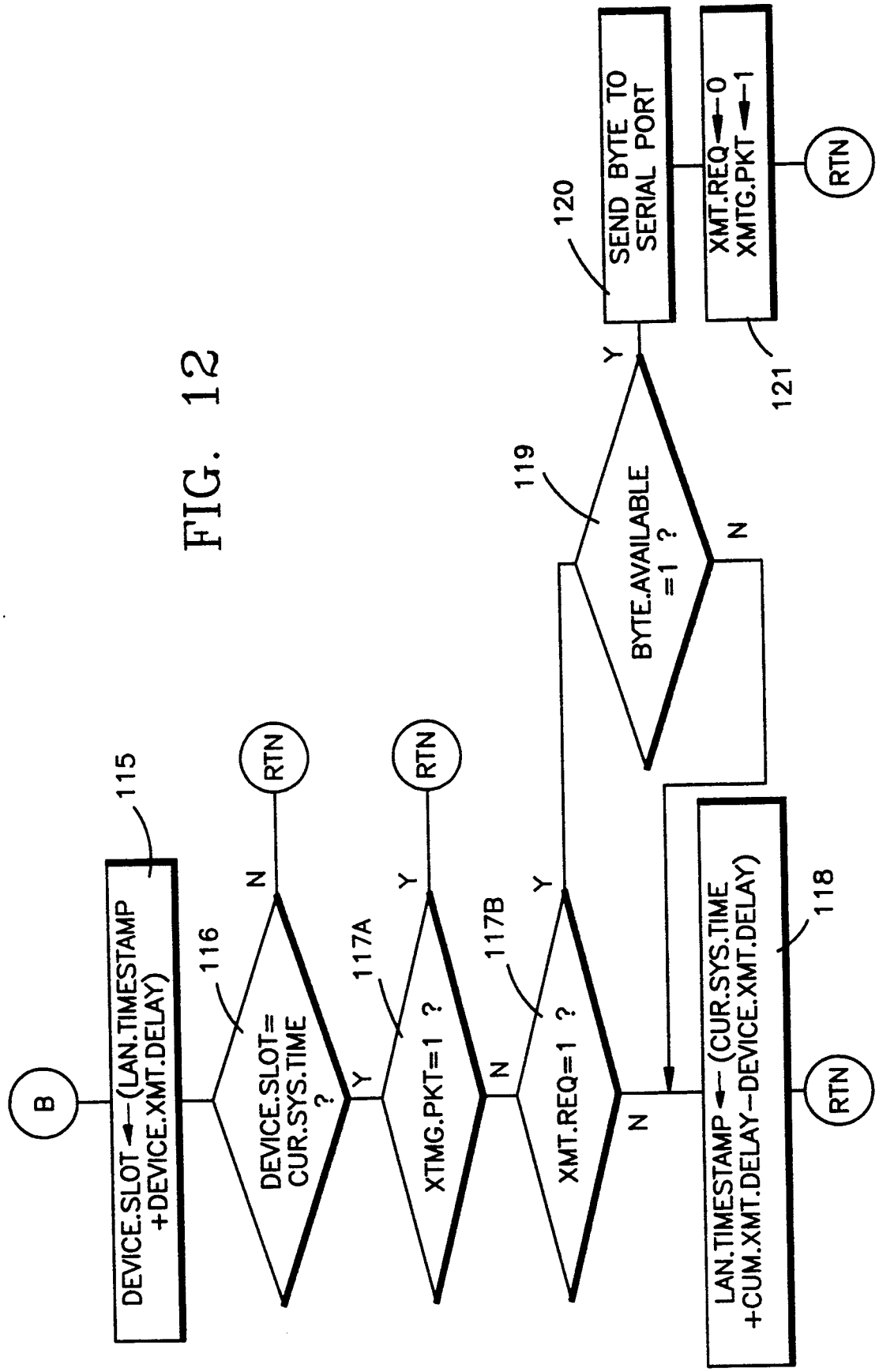

Collision Avoidance Routine 100 has a receiving data module shown in FIG. 10, a transmit throttle module shown in FIG. 11, and a transmitting data module shown in FIG. 12. These modules of the Collision Avoidance Routine will first be discussed in general terms and then specific examples of operation under different conditions will be discussed in reference to FIGS. 13-15.

4.1 Receiving Data Module (FIG. 10)

Referring to FIG. 10, Collision Avoidance Routine 100 begins with a step to determine if the terminal is currently receiving data. Step 101 tests whether the value of the RCVG.PKT flag is 1. As discussed above, the Receive Interrupt Service Routine sets the RCVG.PKT flag to a value 1 in step 60 of the HUNT routine when it is invoked after the hardware detects that data is received from the LAN Bus. The RCVG.PKT flag is reset to value 0 by the Collision Avoidance Routine after a Packet End is declared, as will be discussed below.

If step 101 returns YES, the Collision Avoidance Routine continues with a series of steps to determine if the current data packet has terminated. If step 101 returns NO, the Throttle Routine steps starting at Node A are next executed. Optionally, step 101A may be included to test whether the XMTG.PKT flag is set so that a RTN will be executed immediately if the device is already in a transmit mode. Since both of the following routines starting with Node A involve data transmitting, step 101A may also be considered a part of those routines. Other modifications engendered by inclusion of step 101A will be discussed below.

The data packet termination steps will be discussed first. Termination of the data packet is declared if the LAN Bus has been quiescent for a preselected time period set into the PKT.END.DELAY parameter, which is set in the BAUD case routines discussed above. Remember that the Receive Interrupt Service Routine timestamps each input character byte with the value of CUR.SYS.TIME and stores this value in a parameter labeled LAST.BYTE.TIME. Step 102 creates a PACKET.END.TEST parameter by adding the value of PKT.END.DELAY (assume value 2 for this explanation) to the value of LAST.BYTE.TIME. Step 103 checks whether PACKET.END.TEST is equal to the CUR.SYS.TIME. This test will return YES, if two tics of the system clock have occurred since the last receipt of a character byte, otherwise it returns NO. If NO is returned, a RTN is executed.

Assuming Step 103 returns YES, Step 104 is executed to set the RCVG.PKT parameter to 0 since the routine is declaring the current packet ended. Then step 105 is executed to determine if the current state is BIT.-BUCKET. As discussed above, the BIT.BUCKET state is set by the Receive Interrupt Service Routine when it detects a data buffer overflow. If step 105 returns YES, STATE is set to HUNT in step 106 and the routine execution moves to Node A. Optionally, as shown in dashed lines, a RTN could be executed instead of going through the steps of nodes A and B.

If NO is returned in step 105, the value of the BYTES.RCVD parameter is examined to see if at least twenty characters have been received. If step 107 returns YES, this means that a Runt Packet has been received and should be thrown away, so in step 108 STATE is set to HUNT and BFR.FLAG is set to RDY. As a result the next data character coming in from the next packet will go into the beginning of the buffer. If step 107 returns NO, step 109 executes and STATE is set to HUNT and BFR.FLAG is set to DONE to signal the layer 2 protocol that a data packet is available for it to process. After either of steps 108 and 109, execution continues with Node A or, optionally, with a RTN. A RTN may be executed because the routine has just declared the end of an incoming data packet and transmission cannot possibly be initiated for at least one additional clock tick under the parameter values assumed for this explanation. In other words, the termination of a data packet is declared two milliseconds after the last character is received, but the first device does not transmit until three milliseconds after the last character is received.

It is, of course, within the purview of this invention that the PKT.END.DELAY value might equal the SLOT.LEN value. In this case, it would be important to proceed with execution of the steps in Node A rather than doing a RTN so that the device with the lowest address will not miss its time slot.

4.2 Transmit Throttle (FIG. 11)

The Device Throttle module of the Collision Avoidance Routine is an optional feature of the invention which is invoked when the THROTTLE.IN parameter is set to a value 1. The Terminal Throttle feature invokes a fairness rule on LAN Bus availability for each terminal as discussed in detail above. The basic concept of this feature is to throttle each terminal for a transmit access delay period after each time that a terminal completes a data sending operation. By "throttle" is meant that the terminal is prevented from beginning another data transmission during the period of the Throttle. The fairness rule ensures that each terminal which has not been transmitting has an opportunity to take its turn on the LAN Bus after the transmitting terminal completes its transmission. There are several different versions of a throttle that could be implemented depending on the degree and type of access fairness rule that is desired to be implemented.

Basically, the Throttle Feature in the embodiment shown in FIG. 11 ensures that a terminal that just completed a data transmission activity cannot initiate another data transmission activity until the LAN Bus has been continuously quiescent for a period of time equal to a cumulative transmit delay period for all of the terminals on the LAN Bus. This cumulative transmit delay period is equal to the preselected terminal transmit delay period (e.g. 3 milliseconds in our example) multiplied by the total number of terminals connected to the LAN Bus. Other alternative Throttle features will be discussed below.

If the THROTTLE.IN parameter has a value 1, step 110 checks the value of that parameter and returns YES. If the Throttle feature has been turned off, THROTTLE.IN will have a value 0, and step 109 will return NO and skip the remainder of the Throttle processing steps 110–113. Assume a value of 1 and a YES return from step 109, step 111 checks the value of the THROTTLE.START parameter. If the terminal is not in a Throttle period, the THROTTLE.START parameter will have a value of 0. Thus testing step 110 will return NO, and the rest of the Throttle routine steps 112–114 will be skipped. If the terminal is in a Throttle period, the THROTTLE.START parameter will have a value other than 0, and step 112 will then be executed. In step 112, the value of a THROTTLE.END parameter is calculated as the sum of the values of THROTTLE.START and CUM.XMT.DELAY. The THROTTLE.END parameter is thus the value of CUR.SYS.TIME at which the throttle period will end.

Step 113 then checks the value of CUR.SYS.TIME against the THROTTLE.END parameter. If CUR.SYS.TIME is less than THROTTLE.END, step 113 returns NO, meaning the throttle period has not yet expired and thus a RTN is executed.

If CUR.SYS.TIME is equal to THROTTLE.END, step 113 returns YES, meaning that the throttle period has ended. Step 114 is then executed to load the CUR.SYS.TIME value into the LAN.TIMESTAMP parameter and reset the THROTTLE.START parameter to 0. After this execution goes to Node B.

It should be understood that, as an optional alternative, a RTN could be executed at this point, as shown in dashed lines. If a device has just satisfied its transmit throttle and reset LAN.TIMESTAMP to the value of CUR.SYS.TIME, its time slot will not have arrived even if it is the first device on the LAN Bus.

With the throttle period for this device ended, it can now initiate another data transmission when its time slot arrives. The LAN.TIMESTAMP parameter is the start time of the time slot window on the LAN Bus and a throttle period always ends at the end of one time slot window and the start of the next time slot window.

Remember that the THROTTLE.START parameter is set to the CUR.SYS.TIME each time the Transmit Interrupt Service Routine transmits a data byte. Accordingly, at the end of transmission the terminal, the THROTTLE.START parameter will be the CUR.SYS.TIME when the last character was transmitted. This is the initial starting time of the Throttle period in the transmitting device and also the initial starting time of the time slot window for any of the receiving devices which are not in throttle themselves. If a data packet (actual data or noise) is received before this initial Throttle period expires, the Throttle period starting time is reset by the Receive Interrupt Service Routine to the CUR.SYS.TIME associated with receipt of the last character of that data packet. The Throttle period will then not expire unless and until the LAN Bus remains quiescent during a time period equal to the CUM.XMT.DELAY parameter. Thus the Throttle Features gives each terminal a fair opportunity to obtain access to the LAN Bus. Actual examples of the operation of this Throttle feature under different conditions will be given below.

4.3 Transmit Start (FIG. 12)

When the terminal is not receiving data and is not in a Throttle state, the steps of the transmit start routine shown in FIG. 12 are executed. In step 115 the DEVICE.SLOT parameter is calculated as the sum of the values of LAN.TIMESTAMP and DEVICE.XMT.DELAY. Step 116 then determines if the value of DEVICE.SLOT is equal to CUR.SYS.TIME, i.e. whether the time slot for this device has arrived. If Step 116 returns NO, then RTN is executed. If step 116 returns YES, step 117A examines the value of the XMTG.PKT flag to see if it equals 1 to signal that the device is already transmitting. If step 117A returns YES, then a RTN is executed. Otherwise, step 117B examines the value of XMT.REQ to determine if a transmit request is pending. If step 117 returns YES, then step 119 is executed to determine if a data byte is actually available in the buffer to transmit. If step 119 returns YES, then the data byte is sent to the serial port to be transmitted. Then step 121 is executed to set XMT.REQ to 0 and to set XMTG.PKT to 1.

If step 117B returns NO, that means that this device has passed its time window and a new value of LAN.TIMESTAMP is calculated from which to determine the next time slot for this device. This is done in step 118 by adding the difference in values of CUM.XMT.DELAY and DEVICE.XMT.DELAY to the value of CUR.SYS.TIME. Then a RTN is executed.

Step 119 is included in the Collision Avoidance Routine to take care of a situation in which a higher level protocol may set the XMT.REQ flag before it actually has finished queuing up the data into a transmit data buffer. This routine ignores the XMT.REQ request at this time and the LAN.TIMESTAMP value is recalculated in step 118. The device will then not be able to transmit data until its time slot arrives again. Note that if step 101A, FIG. 10, is included in the Collision Avoidance Routine, then step 117A is not required in the portion of the routine shown in FIG. 12.

4.4 EXAMPLES OF OPERATION

The operation of the Collision Avoidance Routine will be better understood from a consideration of a few specific examples. In each of the examples, the operation of device 3 of four total devices on the LAN Bus will be considered along with discussion of the operation the other devices to the extent that it is relevant. For purposes of discussion of the examples, it will be assumed that the initialization parameters are as follows:

| | |
|---|---|
| BAUD = | BPS 19200 |
| SLOW.FAST = | FAST |
| THROTTLE = | 1 (THROTTLE SELECTED) |

With these parameter values and with four devices on the LAN Bus, the initialization routine will produce the following general and device specific parameter values for device 3:

| General Parameters: | |
|---|---|
| SLOT.LEN = | 3 milliseconds |
| PKT.END.DELAY = | 2 milliseconds |
| CUM.XMT.DELAY = | 12 milliseconds |
| Device 3 Parameter: | 9 milliseconds |
| DEVICE.XMT.DELAY = | |

General Parameters:

4.4.1. Example 1. (FIG. 13)

CONDITIONS: LAN Bus is quiescent and none of the devices have data to transmit. Device 3 operation—device 3 not in throttle.

Figure 13:
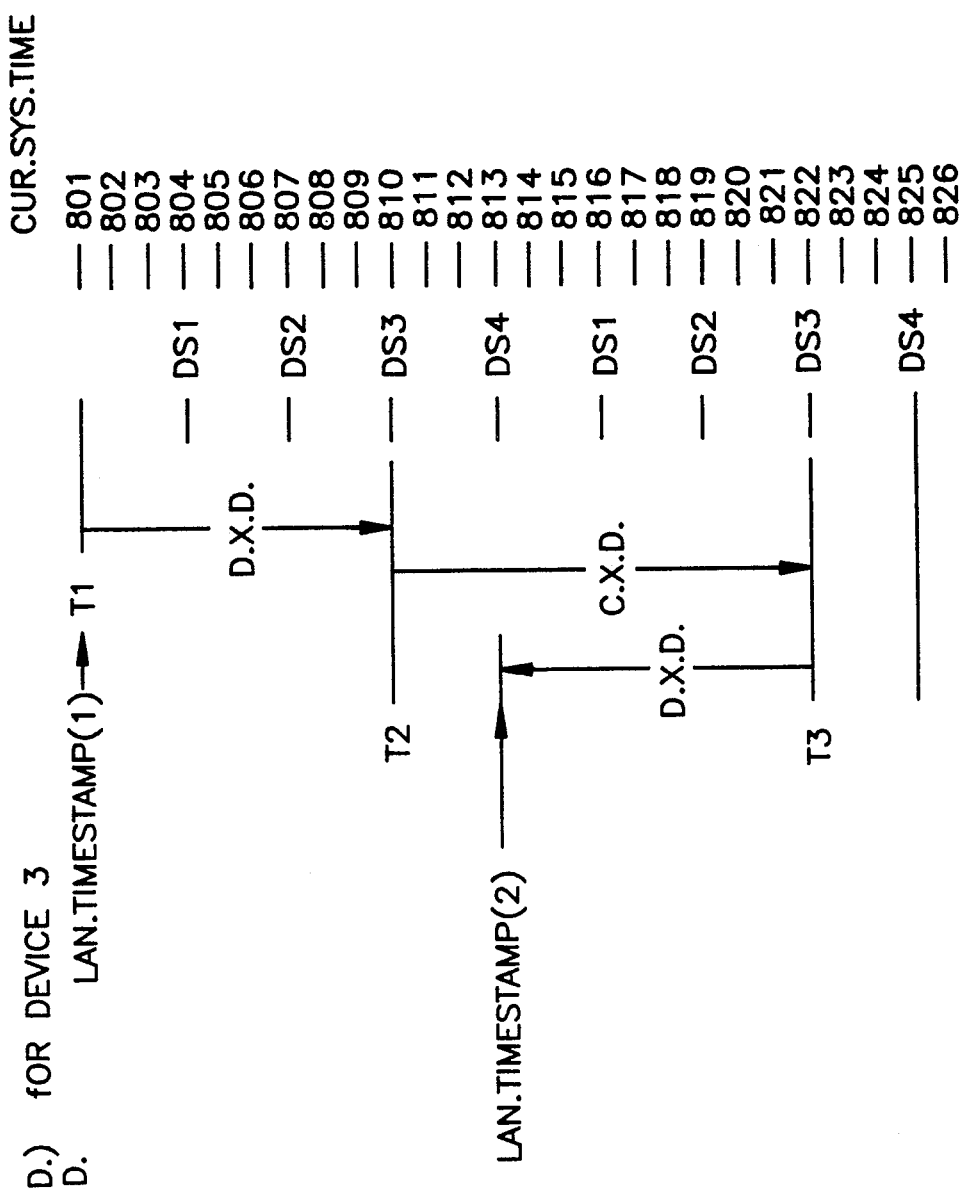
FIGS. 13-15 illustrate examples of operation of the method of this invention under various operational conditions.

Referring to FIG. 13, for this example, an initial LAN.TIMESTAMP value of 801 at time T1 is assumed. On this clock tick, the Collision Avoidance Routine executes step 101 and returns N since no data is being received, so execution proceeds to Node A. Step 110 returns YES because the throttle feature has been selected and step 111 returns NO because we are assuming a no throttle condition at this time, so execution goes to Node B. Step 115 executes to calculate the DEVICE.SLOT parameter for device 3 as a value of 810, the sum of LAN.TIMESTAMP having a value 801 and DEVICE.XMT.DELAY having a value 9. Step 116 returns NO since CUR.SYS.TIME is less than DEVICE.SLOT so a RTN is executed.

Since we have assumed no devices are transmitting, this same execution sequence is repeated on the next eight tics of the system clock until time T2 is reached. At time T2 the execution is the same down to step 116, but this time the CUR.SYS.TIME value of 810 is equal to the calculated DEVICE.SLOT value or 810, so the test in step 116 returns YES. Steps 117 and 118 both return NO since device 3 is not transmitting and has no transmit request pending (per our assumptions). Accordingly, step 119 is executed to calculate a new value of LAN.TIMESTAMP for this device. Since the time slot for this device has been reached and will not be used, the new LAN.TIMESTAMP value calculated will be used to determine when the next device slot for this device will occur.

At each of the clock ticks between time T2 and time T3, the Collision Avoidance Routine will execute through the same steps as it did between time T1 and time T2. At clock tick 822 which is time T3, the execution will be the same as at time T2. This will continue until one of the devices begins transmitting in its time slot.

It should be noted that each of the other devices on the LAN Bus will execute the Collision Avoidance Routine in substantially the same way, using its device parameters. Even though the system clock ticks are not synchronized, each device will calculate the LAN.TIMESTAMP value and these values will generally be in sync within less than 1 millisecond. This assumes that there has been some event on the LAN Bus which brings these devices in sync on the LAN.TIMESTAMP value, such as one device transmitting. During an initial start up period of the LAN Bus, it is possible that the devices will be out of sync and thus there is a small possibility that a data transmit collision might occur. The chances of this are quite small and any such initial collision would not affect the later operation of devices on the LAN Bus in a collision avoidance mode provided by the method of this invention.

Figure 14:
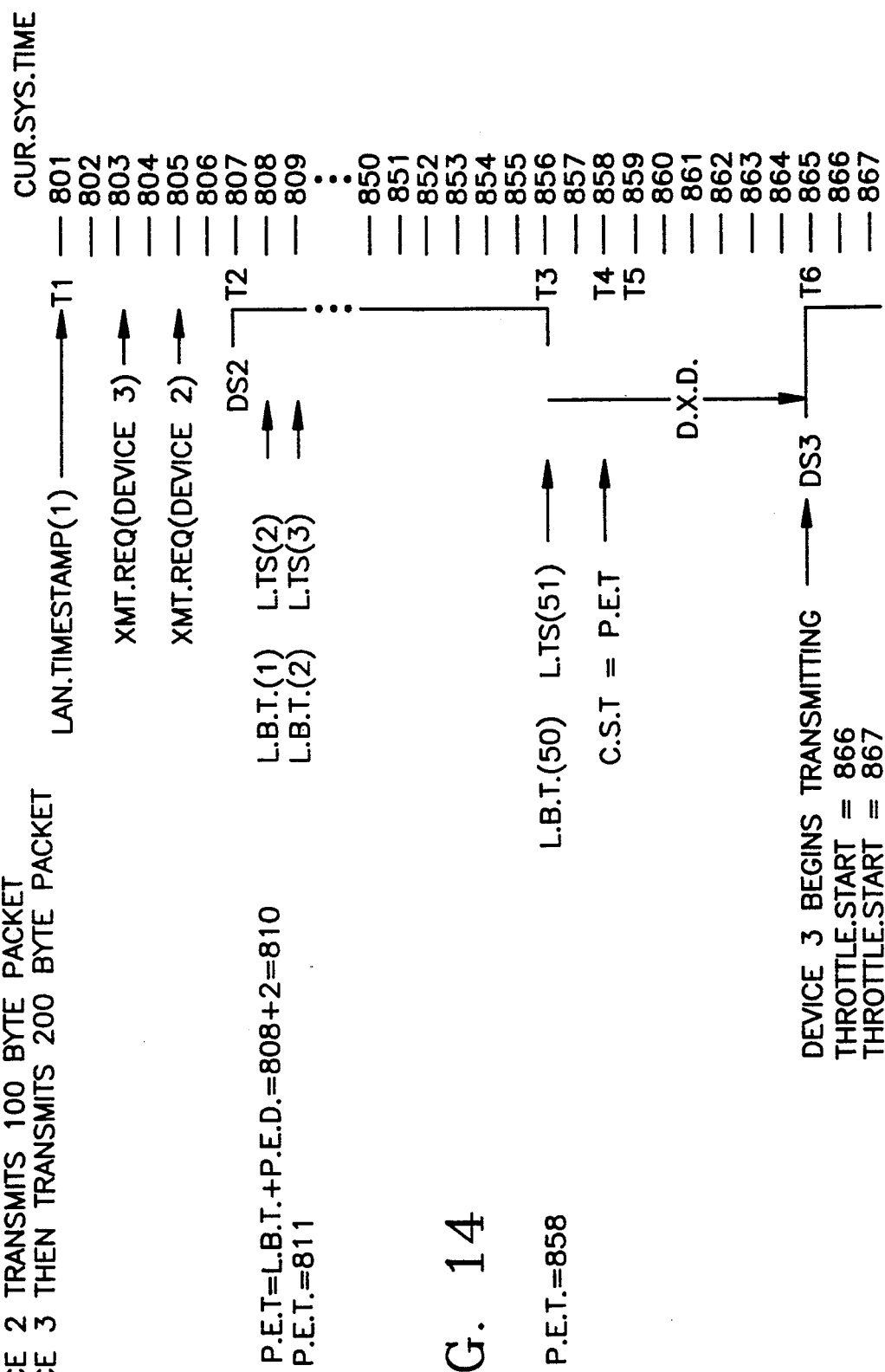

4.4.2. Example 2. (FIG. 14)

CONDITIONS:
a. Devices 2 and 3 not in Throttle
b. Device 3 has transmit request at clock tick 803
c. Device 2 has transmit request at clock tick 805
d. Device 2 transmits 100 character data packet
e. Device 1 has no transmit request pending when its time slot occurs after Device 3 is finished transmitting.

The initial conditions are as in Example 1 above. From time T1 to time T2 both device 2 and device 3 execute the Collision Avoidance Routine with the same sequence of steps as was explained in Example 1 between time T1 and T2 designated in that example. Here at time T2, device 2 has transmit request pending and b transmitting. [Execution of pertinent steps involved in transmitting data will be discussed below in connection with transmission of a data packet by Device 3.] Note that even though the transmit request for device 3 preceded that for device 2, device 2 transmits first because its time slot arrives first. The data packet sent by Device 2 is 100 characters long and thus occupies the LAN Bus until time T3 since data bytes are transmitted at a rate of 0.5 millisecond or twice the rate of the system clock. At time T2, the first character from device 2 has arrived at Device 3 (neglecting transmission delays). Remember that the Receive Interrupt Service Routine being executed in device 3 (as described above) updates the value of LAN.TIMESTAMP to the CUR.SYS.TIME each time a character is received and also sets LAST.BYTE.TIME to CUR.SYS.TIME each time a character is received. Thus each of these parameters in device 3 has a value 807 at time T2 and these values will be incremented with each character received. At time T2, Step 101 of the Collision Avoidance Routine now returns YES since data is being received by Device 3. Step 102 is executed and calculates the value of PACKET.END.TEST as the sum of the value of LAST.BYTE.TIME which is 807 and PKT.END.DELAY which is 2 in this case or a value 809. Step 103 returns NO since PACKET.END.TEST is not equal to CUR.SYS.-

TIME and thus a RTN is executed. Between time T2 and T3, the Collision Avoidance Routine continues on each clock tick to execute the same steps in the same sequence. Since LAST.BYTE.TIME is incremented with each character received, step 103 continues to return NO. Now at time T3, the last character in the transmission by Device 2 is received, but Device 3 doesn't yet know it is the last character. That last character received causes both the LAN.TIMESTAMP and PACKET.END.TEST to be set to a value 856 by the Receive Interrupt Service Routine.

On the next clock tick with CUR.SYS.TIME=857, the Collision Avoidance Routine again executes the same sequence of steps as at time T2. Step 102 calculates PACKET.END.TEST to have a value of 858 (i.e. sum of LAST.BYTE.TIME of 856 and PKT.END-.DELAY of 2), so step 103 returns NO, since PACKET.END.TEST is still greater than CUR.SYS.TIME. On the next clock tick, CUR.SYS.TIME=858 and the Collision Avoidance Routine executes steps 101 and 102 the same as at the prior clock tick. Now, however, step 103 returns YES because CUR.SYS.TIME of 858 is equal to PACKET.END.TEST of 858. So step 104 is executed to set RCVG.PKT back to 0 value, thereby in effect declaring that the incoming data packet has terminated. Step 105 is executed to determine if the current state set in the Receive Interrupt Service Routine is BIT.BUCKET. If this test returns YES, then the data has all been tossed out, so step 106 is executed to set the current state as HUNT prior to executing a RTN.

If step 105 returns NO, then an optional step 107 is executed to determine if the data packet is a "runt packet" having less than 20 bytes or characters. If this testing step returns NO, then step 109 is executed and the STATE parameter is set to HUNT and the BFR.FLAG is set to DONE. As previously explained, this setting of the BFR.FLAG signals the level two software that data is available. If testing step 107 returns YES, then step 108 is executed to set HUNT into the STATE parameter and to set the BFR.FLAG to RDY. This effectively throws away the data in the runt packet as previously explained.

On the next clock tick labeled T5, CUR.SYS.TIME=859, step 101 of the Collision Avoidance Routine executes and returns NO since RCVG.PKT was set to 0 on the last clock tick. Execution thus continues with step 110 which will return YES since we are assuming that the throttle feature is selected rather than deselected. Step 111 also returns NO since we are assuming the condition that device 3 is not in a throttle condition. Execution thus moves next to step 115 in which the DEVICE.SLOT parameter value is calculated to be 865 (i.e. the sum of LAN.TIMESTAMP of 856 and DEVICE.XMT.DELAY of 9). Step 116 returns NO, since DEVICE.SLOT is not equal to CUR.SYS.TIME so a RTN is executed. Between T5 and T6, the Collision Avoidance Routine continues to execute through this same series of steps in with the same result.

Now at time T6, CUR.SYS.TIME has a value 865 which is equal to the DEVICE.SLOT value calculated in step 115. Thus, step 116 now returns YES, and step 117 executes next to check if XMT.STATE has value 1. Since we are at the start of the device 3 time slot, XMT.STATE has a 0 value so step 117 returns NO, and step 118 is executed and returns YES since XMT.REQ does equal 1 at this time. Thus step 120 is next executed and since we are assuming that there is a byte available, this step returns YES, so step 121 is executed to set XMT.STATE to 1 and to call the Transmit Interrupt Service Routine. Then step 122 executes to set XMT.REQ to 0.

On the next clock tick, when CUR.SYS.TIME=866, the Collision Avoidance Routine executes as it did on the prior clock tick down to step 115 which will calculate the DEVICE.SLOT value from the new LAN.TIMESTAMP value set in the Transmit Interrupt Service Routine. Step 116 will return NO since the CUR.SYS.TIME will not be equal to that DEVICE.SLOT value so a RTN will be executed. Since the Transmit Interrupt Service Routine keeps resetting the LAN.TIMESTAMP value to CUR.SYS.TIME with each character transmitted, as long as data is being transmitted, step 116 will return NO. When sending of the data packet is finished, then the LAN.TIMESTAMP value set with the last character transmitted will be the new start of the device slot window and determine when the DEVICE.SLOT for device 3 will arrive.

4.4.2.a. Example 2A.

Now, consider an alternative of Example 2 in which the XMT.REQ for Device 3 does not occur until CUR.SYS.TIME=866. In this variation, at time T6, step 116 returns YES, but step 117 returns NO, because XMT.REQ is still 0. Then step 118 is executed to reset the value of LAN.TIMESTAMP since this device now knows that its time slot will have passed without a XMT.REQ pending to utilize that slot. The new LAN.TIMESTAMP value will be 868. On the next clock tick, when CUR.SYS.TIME is 866, step 115 of the Collision Avoidance Routine will calculate DEVICE.SLOT as having a value 877. Thus step 116 will return NO and a RTN will be executed. This same sequence of execution will continue until CUR.SYS.TIME=877 or another device starts transmitting. If one of the other devices (I.e. one not in Throttle condition) starts transmitting at the start of its time slot, then Device 3 will have to wait until its time slot comes up 9 milliseconds after that device transmits its last character.

4.4 3. Example 3. (FIG. 15)

Figure 15:
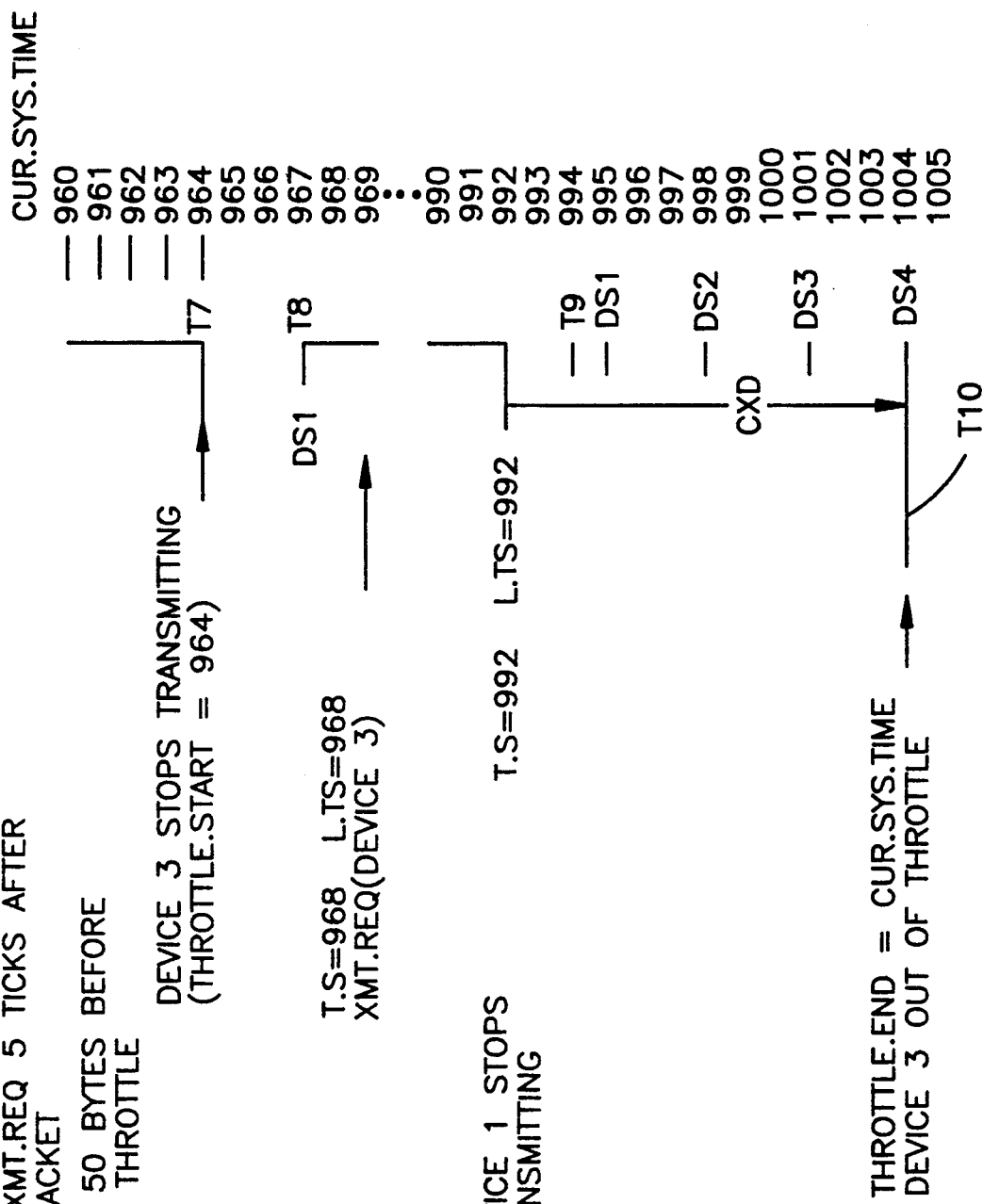

Example 3 shown in FIG. 15 follows the conditions of Example 2 with Device 3 beginning to transmit at T6 when CUR.SYS.TIME=865, finishing transmitting 200 bytes at T7 when CUR.SYS.TIME =964, and then having another XMT.REQ when CUR.SYS.TIME=969 while Device 3 is still in a Throttle Condition. Beginning at T6 with transmission of the first character by Device 3, the Transmit Interrupt Service Routine sets the THROTTLE.START value to the CUR.SYS.TIME value of 865. So between time T6 and time T7, the Collision Avoidance Routine executes in the following manner. Step 101 returns NO since Device 3 is transmitting and not receiving data. Step 110 returns NO since we are assuming that the optional throttle feature is selected. Step 111 returns YES on each clock tick since the Transmit Interrupt Service Routine has set THROTTLE.START to the value of CUR.SYS.TIME. Step 112 calculates a new value of THROTTLE.END by adding the value of CUM.XMT.DELAY to the value of THROTTLE.START. Since THROTTLE.START is reset each time to CUR.SYS.TIME, THROTTLE.END stays larger than CUR.SYS.TIME during this entire period between T6 and T7. Thus step 113 will always return NO during this period of data transmission by Device 3 and a RTN will be executed. Now at time T7, with transmission of the last character, THROTTLE.START is no longer incremented by the Transmit Interrupt Service Routine on each clock tick and remains at a value of 964. Between time T7 and time T8, the Collision Avoidance Routine executes as follows. Step 101 returns NO, step 110 returns YES, step 111 returns YES, step 111 calculates THROTTLE.END each time as having a value of 964 plus 12 or 986 and step 112 returns NO since during this time period CUR.SYS.TIME is always less than 986.

At time T8, Device 1 starts transmitting and Device 3 executes the Collision Avoidance Routine the same way that it did in example 2 while Device 2 was transmitting. However, the Receive Interrupt Service Routine is now incrementing the value of THROTTLE.START in step 53, FIG. 6. Thus, at time T9 when CUR.SYS.TIME=994 and the end of the data packet from Device 1 is declared, both LAN.TIMESTAMP and THROTTLE.START will have the value 992. Thus on each subsequent clock tick, step 112 will calculate THROTTLE.END as having a value of 1004 (i.e. the sum of the value of LAN.TIMESTAMP or 992 and the value of CUM.XMT.DELAY or 12 which equals 1004. When CUR.SYS.TIME=1004, Device 3 will be out of throttle condition, step 113 will return YES, and step 114 will executed to set LAN.TIMESTAMP to 1004 and reset THROTTLE.START to 0. On the following clock ticks, the Collision Avoidance Routine will execute like it did between time T5 and T6 in Example 2 above. Assuming no other device starts transmitting on the LAN Bus, Device 3 will start transmitting again when CUR.SYS.TIME=1013, i.e. the start of the time slot for Device 3 as calculated in step 115.

It should be noted that Device 3 comes out of a Throttle period just at the start of the time slot for Device 4. This means that Device 4 might start transmitting just as Device 3 is coming out of throttle. If this occurs, it is possible that Device 3 might detect the receipt of data and be kept in throttle. It is also possible that Device 3 might not detect the receipt of data at time T10 and go out of throttle. In either event, there is no possibility with any collision of data from different devices.

4.4.4. Alternative Throttle Routines (FIGS. 16 and 17)

Figure 16:
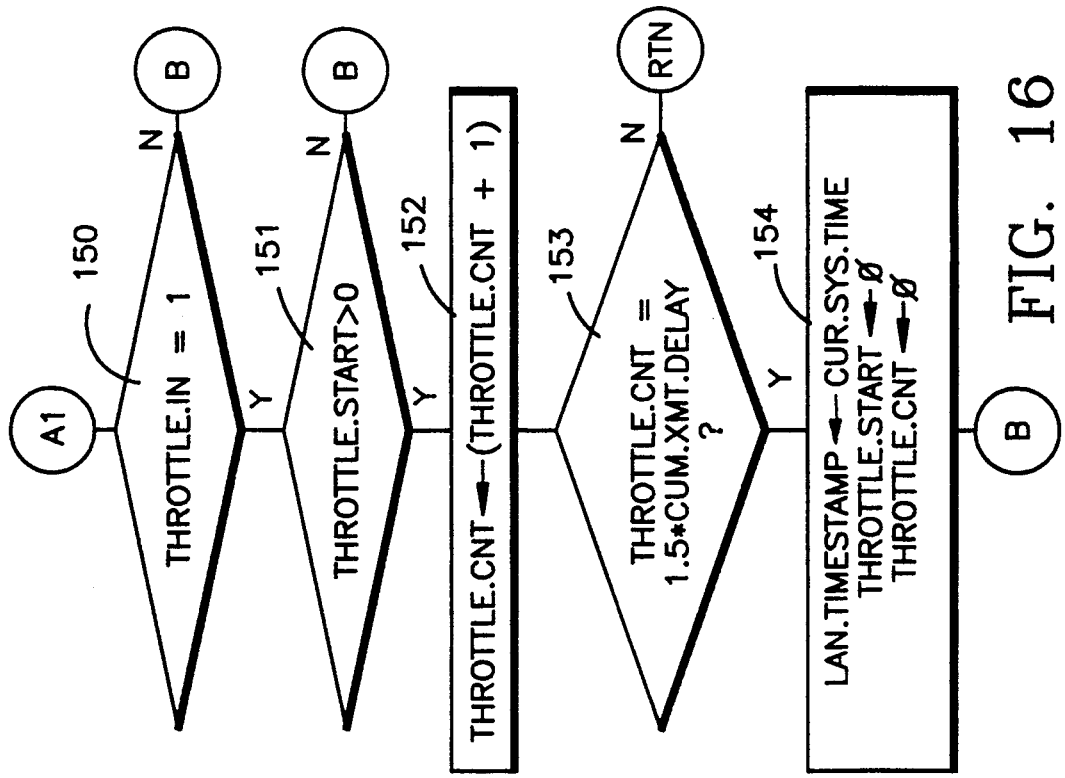

One alternative Throttle routine is depicted in FIG. 16. In this routine, instead of keeping a terminal in a throttle condition until the LAN Bus has been quiescent for a continuous period equal to the value of CUM.XMT.DELAY, the quiescent time on the LAN Bus is cumulated in a THROTTLE.CNT parameter and the device goes out of throttle when the value of THROTTLE.CNT is some preselected multiple of the CUM.XMT.DELAY between one and two. One and one-half is used in this example.

The first two steps 150 and 151 of the Throttle routine in FIG. 16 are the same as in the preferred routine shown in FIG. 11. In step 152 the THROTTLE.CNT parameter is incremented and then step 153 is executed to test if the value of THROTTLE.CNT is equal to 1.5 times the value of CUM.XMT.DELAY. If NO is returned, a RTN is executed and the device remains in Throttle. If YES is returned in step 153, the throttle period is over and step 154 executes to set LAN.TIMESTAMP to the value of CUR.SYS.TIME and to set both THROTTLE.START and THROTTLE.CNT to 0.

Figure 17:
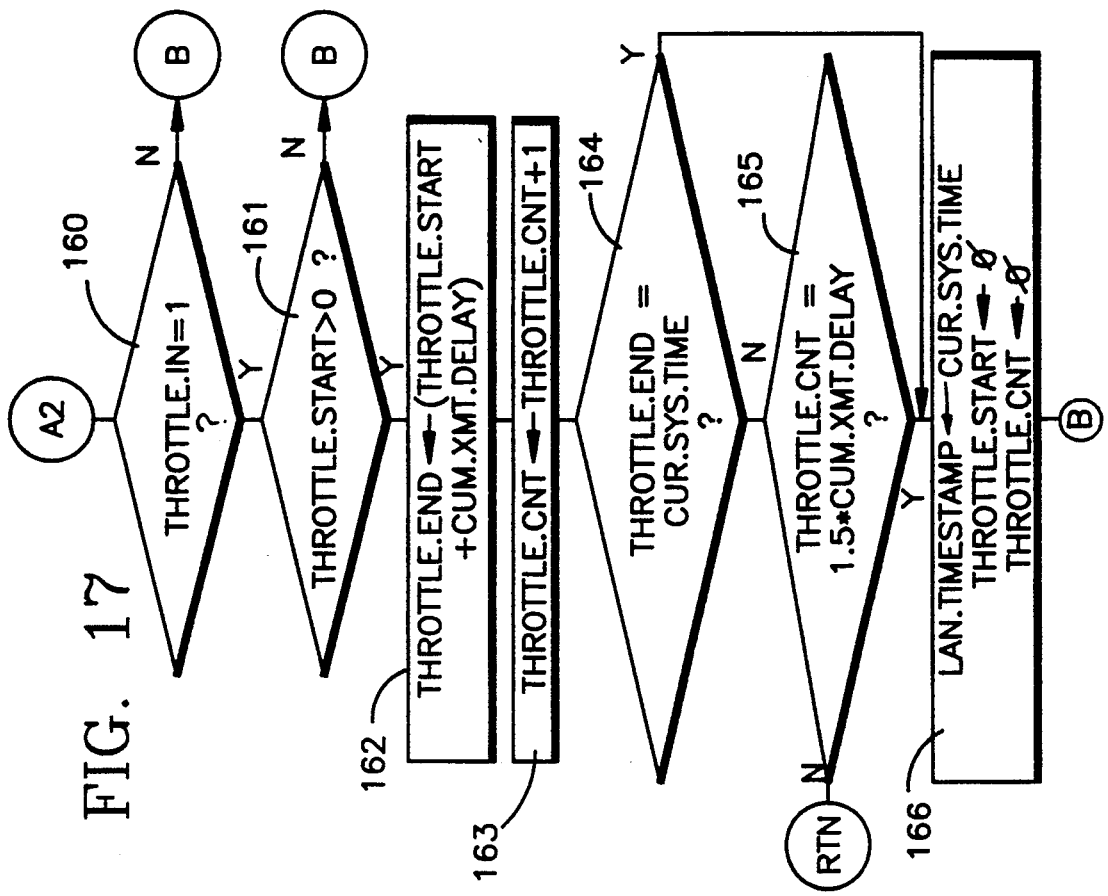
FIGS. 16 and 17 illustrate the steps of an alternative Collision Avoidance Routine utilizing the method of this invention.

In the alternative Throttle routine of FIG. 17, the two throttle algorithms of FIGS. 11 and 16 are combined. The first two steps 160 and 161 are the same as before. Step 162 calculates the value of THROTTLE.END as before and step 163 increments THROTTLE.CNT. Step 164 tests the value of THROTTLE.END and step 165 tests the value of THROTTLE.CNT. If either testing step returns YES, then the throttle period is ended and step 166 is executed to set LAN.TIMESTAMP to CUR.SYS.TIME and to zero out the values of THROTTLE.START and THROTTLE.CNT.

5.1 Alternative Collision Avoidance Routine

It should be apparent that there are alternative approaches that could be taken and alternative sequences of steps utilized to achieve the same collision avoidance features and functions within the principles of this invention. Some of these optional alternatives were discussed above. Another optional alternative would involve calculation of the DEVICE.SLOT for a particular device at times when the value of that parameter must be changed to account for some new development in the operation of the system. So, for example, step 115 in FIG. 12 could be eliminated if the Initialization Routine of FIG. 2, the receiving data module of FIG. 10, the throttle module of FIG. 11, and the data transmit module of FIG. 12 each calculated a new DEVICE.SLOT parameter at an appropriate place in the sequence of steps when that parameter is needed. In the Initialization Routine of FIG. 2, the DEVICE.SLOT parameter could be calculated at any point in the routine using the zero value of LAN.TIMESTAMP to calculate when the first time slot for this device will occur. In FIG. 10, a new DEVICE.SLOT value would be calculated in or after step 104 as part of declaring the termination of an incoming data packet. In FIG. 11, the value of DEVICE.SLOT could be calculated as part of step 114 after the new LAN.TIMESTAMP value is set in that step. Also in FIG. 12, a new value of DEVICE.SLOT could be calculated in or after step 118 when LAN.TIMESTAMP is reset due to missing the time slot for the device.

The general principles of this invention and specific embodiments have been set forth above for purposes of illustration. It should be understood that persons of skill in the art could make numerous modification in the details of implementation without departing from the scope of the invention as claimed in the following claims.

What is claimed is:

1. A method for data communication between a multiplicity of devices coupled to a LAN bus without collisions between data transmissions from plural devices, said data communication taking place at a preselected baud rate common to each device, each device being assigned a unique device address and each device being assigned a unique device transmit time slot within a LAN transmit window of prearranged length based on said unique device address and each device having a system time clock incrementing a CUR.SYS.TIME parameter at a prearranged common frequency, said method comprising the steps of:
   a. responding to each data character received in each receiving device by
      a.1. loading a LAN.TIMESTAMP parameter with the value of said CUR.SYS.TIME parameter in said receiving device so that said LAN.TIMES- TAMP parameter thereby indicates the time of receipt of the last data character when an incoming data packet terminates and correspondingly the start time of a LAN transmit window, b. responding to each tick of said system time clock in each receiving device after termination of an incoming data packet by
  b.1. determining whether the value of said CUR.SYS.TIME parameter at said clock tick represents a point in said unique transmit time slot for said receiving device within said LAN transmit window, and
  b.2. in response to determining that said value of said CUR.SYS.TIME parameter represents a point in said unique transmit time slot, initiating the transmission of data by said receiving device if a data packet is available for transmission.

2. The method of claim 1, further comprising the steps of:
  c. responding to the transmission of each data character in a data packet by a transmitting device by loading said LAN.TIMESTAMP parameter will contain the time of transmission of the last data character by said transmitting device;
  d. responding to transmission of a data packet by said transmitting device by setting a throttle start parameter to a value indicating that said transmitting device has transmitted a packet of data and thereby to signal an active throttle period for said transmitting device;
  e. responding to each tick of said system time clock in said transmitting device after transmission of the last data character by said transmitting device by
    e.1. determining whether said device is in an active throttle period based on the value of said throttle start parameter, and executing said steps b.1. and b.2. if said device is not in an active throttle period, or otherwise,
    e.2. determining whether said active throttle period is ended based on a predetermined throttle algorithm, and
    e.3. inhibiting transmission of another packet of data by said transmitting device if said active throttle period is not ended, and
    e.4. resetting said throttle start parameter to a value indicating that said device is not in an active throttle period if said active throttle period is ended.

3. The method of claim 2, wherein
  said step d. is carried out by setting said throttle start parameter to the value of said CUR.SYS.TIME parameter as each data character is transmitted by said transmitting device,
  said step e.2. comprises the steps of
    e.2.a. adding to the value of said throttle start parameter the time length of said LAN transmit window to produce a THROTTLE.END parameter; and
    e.2.b. determining that said active throttle period is ended if the value of said CUR.SYS.TIME parameter is equal to the value of said THROTTLE.END parameter;
  and further comprising the step of
  f. responding to each data character received during said active throttle period of said transmitting device by setting said throttle start parameter to the value of said CUR.SYS.TIME parameter
whereby said transmitting device remains in an active throttle period after transmitting a packet of data until said LAN BUS has been continuously quiescent for a period of time equal to the length of said LAN transmit window.

4. The method of claim 2, wherein
  said step d. is carried out by setting said throttle start parameter to any positive value at the start of transmission of a data packet.
  and said step e.1. comprises determining if said throttle start parameter has a positive value,
  and said step e.2. comprises
    e.2.a. incrementing the value of a THROTTLE.CNT parameter on each tick of said system time clock when said transmitting device is not receiving a data character; and
    e.2. determining that said active throttle period is ended if the value of said THROTTLE.CNT parameter is equal to a preselected fixed value of a THROTTLE.END parameter.

5. The method of claim 4, wherein said fixed value of said THROTTLE.END parameter is a multiple of the time length of said LAN transmit window.

6. A method for data communication between a multiplicity of devices on a local area network without collisions between data transmissions from plural devices, said data communication taking place at a preselected baud rate common to each device and each device having a system time clock incrementing a CUR.SYS.TIME parameter at a prearranged common frequency and each device having a multiplicity of memory locations for operating parameters and data, said method comprising the steps of:
  a. loading into a prearranged memory location in each of said devices a device address unique to each device;
  b. loading into separate memory locations in each of said devices a highest device address, and preselected common values for a slot length parameter named and a packet end delay parameter named, with said values for SLOT.LEN and PKT.END.DELAY being related to said baud rate;
  c. calculating and storing in two separate memory locations in each device a value for a device transmit delay parameter named as a product of said device address loaded in step a. and said SLOT.LEN and a value for a cumulative transmit delay parameter named as a product of said highest device address and said SLOT.LEN;
  d. responding to the first data character received by each of a plurality of said devices from a transmitting one of said devices by setting in each device a RCVG.PKT parameter to a value indicating that a data packet is being received;
  e. responding to the first and each subsequent data character in a continuous series of data characters in an incoming data packet received by each of said plurality of said devices from a transmitting one of said devices by storing the value of the CUR.SYS.TIME parameter in each said device in both an assigned LAN.TIMESTAMP memory location and a LAST.BYTE.TIME memory location;
  f. responding to each tick of said system time clock in each device while said value of said RCVG.PKT parameter in said device indicates that a data packet is being received by.
    f.1. calculating the value of a PACKET.END.TEST parameter as the sum of the value of LAST.BYTE.TIME and the value of PKT.END.DELAY;

f.2. comparing the current value of said CUR.SYS.TIME parameter to the value of said PACKET.END.TEST parameter and, when said values are equal, setting said RCVG.PKT parameter to a value indicating that an incoming data packet has terminated;

g. responding to each tick of said system time clock while the value of said RCVG.PKT parameter in each device has a value indicating that a previous incoming data packet has terminated by, g.1. calculating the value of a DEVICE.SLOT parameter as the sum of the current value stored in said LAN.TIMESTAMP memory location and the value of DEVICE.XMT.DELAY;

g.2. comparing the current value of said CUR.SYS.TIME parameter to said value of said DEVICE.SLOT parameter value and, when said values are equal, g.2.a. initiating transmission of a data packet by said device if a transmit request is pending, or otherwise g.2.b. calculating and storing a new value of said LAN.TIMESTAMP parameter as the sum of the current value of said CUR.SYS.TIME parameter and the difference between the value of said CUM.XMT.DELAY parameter and the value of said DEVICE.XMT.DELAY parameter for said device.

7. The method of claim 6, further comprising the steps of:

h. responding to the transmission of each data character of a data packet by a transmitting device by loading said LAN.TIMESTAMP memory location with the current value of said CUR.SYS.TIME parameter so that said LAN.TIMESTAMP memory location will contain the time of transmission of the last data character ion said data packet when said last data character is transmitted;

i. responding to transmission of a data packet by a transmitting device by setting a THROTTLE.START parameter to a value indicating that said transmitting device has transmitted a packet of data;

j. responding to each tick of said system time clock in said transmitting device after transmission of the last data character of a data packet by j.1. determining whether said device is in an active throttle period based on the value of said THROTTLE.START parameter, and executing said steps g.1. and g.2. if said device is not in an active throttle period, or otherwise, j.2. determining whether said active throttle period is ended based on a predetermined throttle algorithm, and j.3. inhibiting transmission of another data packet by said transmitting device if said active throttle period is not ended, and j.4. resetting said THROTTLE.START parameter to a value indicating that said device is not in an active throttle period if said active throttle period is ended.

8. The method of claim 7, wherein
said step i. comprises setting said THROTTLE.START parameter to the value of said CUR.SYS.TIME parameter as each data character is transmitted by said transmitting device
said step j.2. comprises the steps of j.2. a. adding to the value of said THROTTLE.START parameter the value of CUM.XMT.DELAY to produce a THROTTLE.END parameter; and j.2. b. determining that said active throttle period is ended if the value of said CUR.SYS.TIME parameter is equal to the value of said THROTTLE.END parameter;

and further comprising the step of k. responding to each data character received during said active throttle period of said transmitting device by setting said THROTTLE.START parameter to the value of said CUR.SYS.TIME parameter, whereby said transmitting device remains in an active throttle period after transmitting a packet of data until said LAN Bus has been continuously quiescent for a period of time equal to the value of CUM.XMT.DELAY.

9. The method of claim 7, wherein
said step i. comprises setting said THROTTLE.START parameter to any positive value at the start of transmission of a data packet,
and said step j.1. comprises determining if said THROTTLE.START parameter has a positive value,
and said step j.2. comprises j.2. a. incrementing the value of a THROTTLE.CNT parameter on each tick of said system time clock when said transmitting device is not receiving a data character; and j.2.b. determining that said active throttle period is ended if the value of said THROTTLE.CNT parameter is equal to a preselected fixed value of a THROTTLE.END parameter.

10. The method of claim 9, wherein said fixed value of said THROTTLE.END parameter is a multiple of the value of CUM.XMT.DELAY.

11. The method of claim 1, wherein said step a. is performed during a Receiving Data Time Period and further comprises the steps of:

a.1. responding to each character received during said Receiving Data Time Period by loading a LAST.BYTE.TIME parameter with the value of said CUR.SYS.TIME parameter so that said LAST.BYTE.TIME parameter contains the time of the last character received; and a.2. responding to each tick of said system time clock during said Receiving Data Time Period by determining if the value of said CUR.SYS.TIME parameter is equal to the sum of said value of said LAST.BYTE.TIME parameter and a prearranged value for a PKT.END.DELAY parameter and, if so, declaring an end to said Receiving DATA Time Period; and said step b. is carried out only after said step a.2. declares an end to said Receiving Data Time Period.

12. The method of claim 1, wherein said transmit time slot for each device has a length equal to the period between successive ticks of said system time clock and each device has stored therein a common value of a CUM.XMT.DELAY parameter representing the length of said LAN transmit window in ticks of said system time clock and a unique value of a DEVICE.XMT.DELAY parameter representing the number of ticks of said system time clock between the start of a LAN transmit window and the start of the transmit time slot for said device, said step b.1. comprises the steps of:
      b.1.a. calculating the value of a DEVICE.SLOT parameter as the sum of the value of said LAN.TIMESTAMP parameter and the value of said DEVICE.XMT.DELAY parameter; and
      b.1.b. determining that said unique transmit time slot for said receiving device has arrived if the value of CUR.SYS.TIME is equal to the value of said DEVICE.SLOT parameter;
   said step b.2. comprises the steps of:
      b.2.a. responding to step b.1.b determining that said unique transmit time slot for said receiving device has arrived by checking if a data packet is available for transmission; and
      b.2.b. if step b.2.a. determines that a data packet is available, initiating transmission of said data packet, or otherwise,
      b.2.c. setting a new value of said LAN.TIMESTAMP parameter as a function of the value of said CUM.XMT.DELAY parameter so that said new value represents the start of the next LAN transmit window for said receiving device.

13. The method of claim 12, wherein said step b.2.c. comprises calculating a new value of said LAN.TIMESTAMP parameter by adding the value of said CUM.XMT.DELAY parameter to the value of said CUR.SYS.TIME parameter and subtracting the value of said DEVICE.XMT.DELAY parameter.

* * * * *